US011620816B1

(12) United States Patent
Liang et al.

(10) Patent No.: US 11,620,816 B1
(45) Date of Patent: *Apr. 4, 2023

(54) HARDWARE EFFICIENT ROI ALIGN

(71) Applicant: Ambarella International LP, Santa Clara, CA (US)

(72) Inventors: Xuejiao Liang, Sunnyvale, CA (US); Wei Fang, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,807

(22) Filed: Jun. 29, 2022

Related U.S. Application Data

(63) Continuation of application No. 16/576,070, filed on Sep. 19, 2019, now Pat. No. 11,423,644.

(51) Int. Cl.
*G06V 10/94* (2022.01)
*G06K 9/62* (2022.01)
*G06T 1/60* (2006.01)

(52) U.S. Cl.
CPC ........... *G06V 10/94* (2022.01); *G06K 9/6219* (2013.01); *G06T 1/60* (2013.01); *G06F 2212/1016* (2013.01)

(58) Field of Classification Search
CPC ........ G06V 10/94; G06K 9/6219; G06T 1/60; G06F 2212/1016
See application file for complete search history.

(56) References Cited

U.S. PATENT DOCUMENTS

| 11,080,542 B2 * | 8/2021 | Fan ......................... G06V 10/25 |
| 2020/0057938 A1 * | 2/2020 | Lu ........................... G06N 3/063 |
| 2021/0365194 A1 * | 11/2021 | Song ..................... G06F 3/0631 |

* cited by examiner

*Primary Examiner* — Casey L Kretzer
(74) *Attorney, Agent, or Firm* — Christopher P. Maiorana, PC

(57) ABSTRACT

An apparatus including a memory and a circuit. The memory may comprise three buffers. The circuit may be configured to allocate the three buffers in the memory based on a size of a full resolution feature map, receive a plurality of regions of interest ranked based on a feature map pyramid, generate a plurality of levels of the feature map pyramid starting from the full resolution feature map and store the levels in the buffers. The circuit may store the levels that are used by at least one of the plurality of regions of interest or do have a dependent level, the levels that are generated may be stored in the buffers in a pattern that ensures the level is stored until no longer needed to create the dependent level and enables the level to be discarded when no longer needed to create the dependent level.

20 Claims, 13 Drawing Sheets

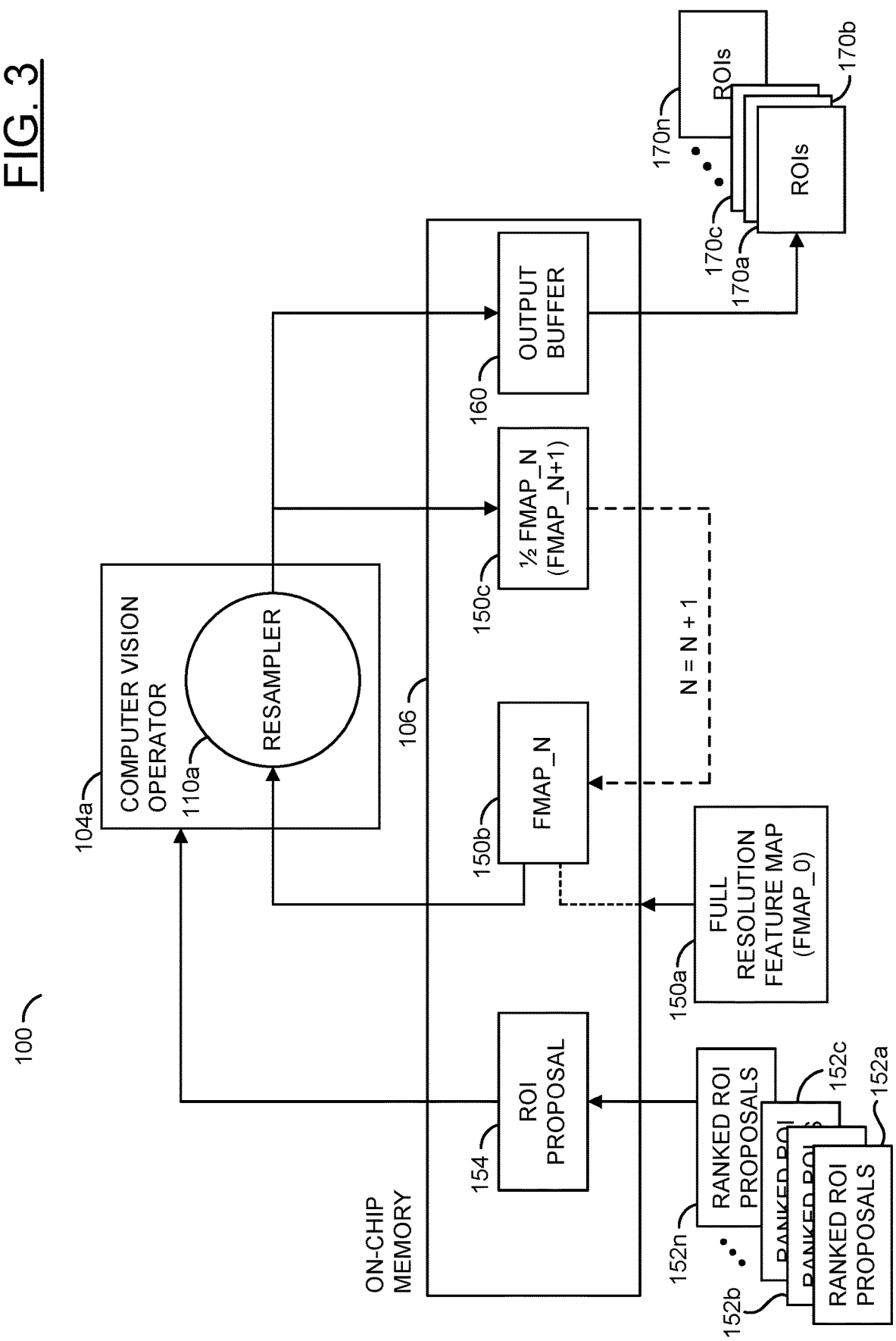

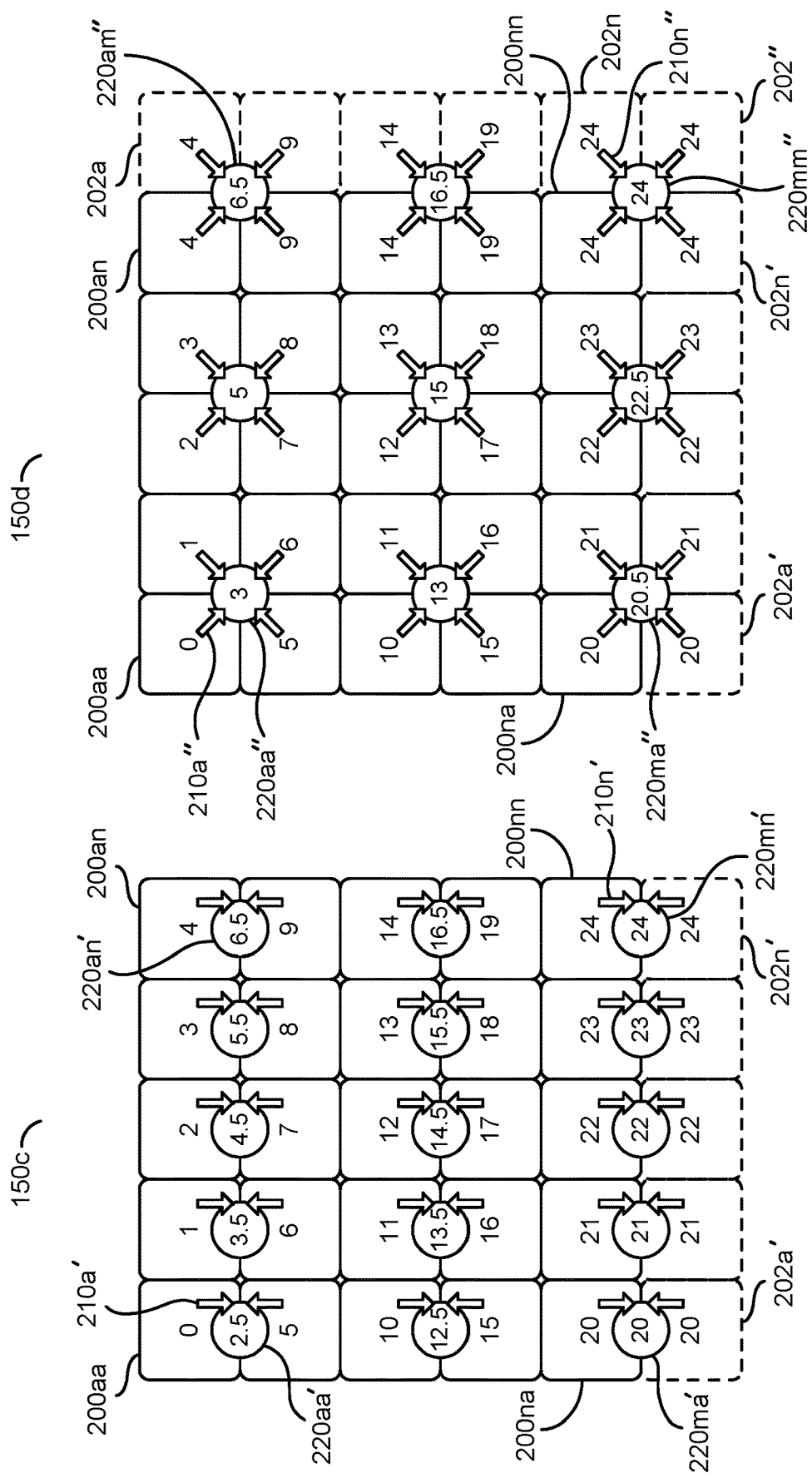

HARDWARE EFFICIENT ROI ALIGN

This application relates to U.S. application Ser. No. 16/576,070, filed on Sep. 19, 2019, which is hereby incorporated by reference in its entirety.

FIELD OF THE INVENTION

The invention relates to computer vision generally and, more particularly, to a method and/or apparatus for implementing a hardware efficient RoI Align.

BACKGROUND

Two stage object detectors reduce computation requirements and maintain detection accuracy by employing a feature extraction step. Regions of interest are converted into fixed-size regions in various spatial dimensions. Region of Interest (RoI) Align, is one of the latest feature extraction methods for Convolutional Neural Network (CNN) based object detectors. RoI Align was introduced in Mask-RCNN. RoI Align achieves higher detection accuracy and makes key point detection and instance segmentation achievable on top of a two stage object detector. However, RoI Align utilizes a variable input region size. The variable input region size introduces new issues in hardware design, such as a large on-chip buffer requirement and a long coprocessor processing time.

One method of implementing a feature map pyramid, which is made up of different decimations of the original feature map, for RoI Align is to save all pyramid levels in DRAM and load the pyramid levels into an on-chip memory when needed. However, storing all the pyramid levels in DRAM introduces a long transfer delay to communicate with the DRAM. Furthermore, transferring the pyramid levels from DRAM consumes a large amount of DRAM bandwidth, which is valuable to other applications running concurrently on other hardware modules. Another method of implementing a feature map pyramid for RoI Align is to directly keep all pyramid levels in on-chip memory. However, for a large feature map, storing all pyramid levels in on-chip memory can consume so much space that not enough storage space will be available (i.e., all levels will not fit in the space constraints of the on-chip memory).

It would be desirable to implement a hardware efficient RoI Align.

SUMMARY

The invention concerns an apparatus including a memory and a circuit. The memory may be configured to store/present data in response to input/output requests and may comprise three storage buffers. The circuit may be configured to receive a full resolution feature map, allocate the three storage buffers in the memory based on a size of the full resolution feature map, receive a plurality of regions of interest that have been ranked based on a feature map pyramid, generate a plurality of levels of the feature map pyramid starting from the full resolution feature map and store the levels in the storage buffers. The circuit may generate the levels that are used by at least one of the plurality of regions of interest or have a dependent level, the levels that are generated are stored in the storage buffers in a pattern that ensures the level is stored until no longer needed to create the dependent level and enables the level to be discarded when no longer needed to create the dependent level.

BRIEF DESCRIPTION OF THE FIGURES

Embodiments of the invention will be apparent from the following detailed description and the appended claims and drawings.

FIG. 3 is a block diagram illustrating a memory flow of the on-chip memory.

FIG. 6 is a diagram illustrating a dependent feature map level downsampled in the Y direction.

FIG. 7 is a diagram illustrating a dependent feature map level downsampled in an X and Y direction.

DETAILED DESCRIPTION OF THE EMBODIMENTS

Embodiments of the present invention include providing a hardware efficient RoI Align that may (i) store feature map pyramid levels in on-chip memory as needed, (ii) generate feature map pyramid levels on the fly, (iii) discard feature map pyramid levels when no longer needed, (iv) be implemented on a computer vision processor, (v) implement an RoI Align operation without generating DRAM traffic for storing feature map levels, (vi) repetitively use three storage buffers to store feature map pyramid levels, (vii) skip generating feature map levels that are not used, (viii) rank region of interest proposals in order of pyramid levels needed, (ix) divide large feature maps into batches that fit the on-chip memory and/or (x) be implemented as one or more integrated circuits.

In various embodiments of the present invention, a hardware efficient RoI Align method may be implemented. The RoI align method in accordance with embodiments of the present invention may be configured to store feature map pyramid levels in on-chip memory as needed and then discard the feature map pyramid levels after use (e.g., overwrite levels when no longer needed). For example, not all feature map pyramid levels may be generated and/or stored. In an example, feature map pyramid levels that are not used by a region of interest (ROI) proposal and are not used to generate a dependent feature map pyramid level may not be needed.

The RoI Align method in accordance with embodiments of the present invention may be configured to process the ROI proposals in the order of the feature map pyramid levels. Three memory buffers may be allocated to store the feature map pyramid levels. Since the feature map pyramid levels may be generated on the fly and as needed, the three memory buffers may be repetitively used. By repetitively using the three memory buffers, intelligently selecting the order of the memory buffers and discarding the feature map pyramid levels after use, the feature map pyramid levels may be stored within the storage constraints of the on-chip memory and without generating DRAM traffic.

Figure 1:
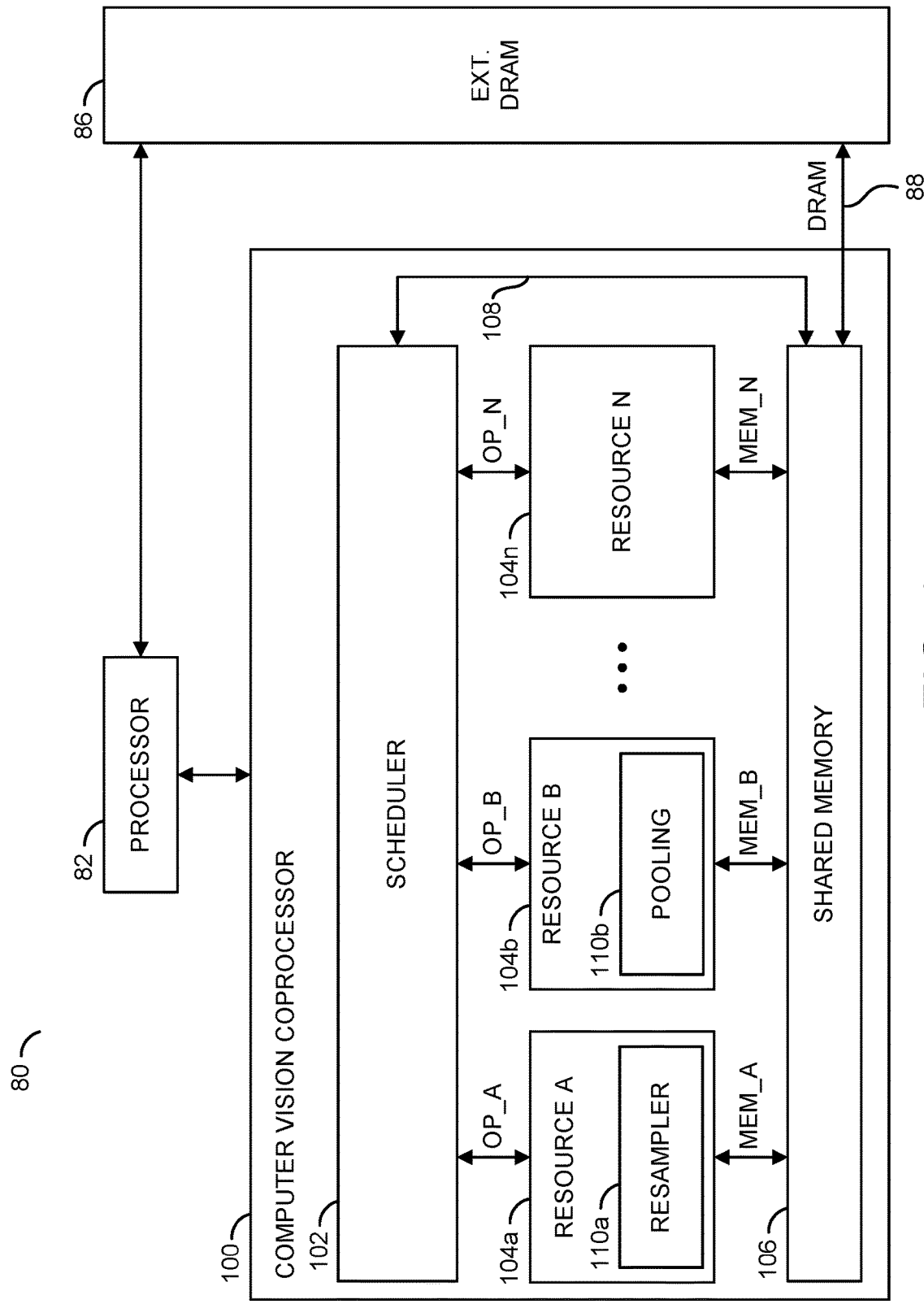
FIG. 1 is a block diagram illustrating an example embodiment of the present invention.

Referring to FIG. 1, a block diagram illustrating an example embodiment of the present invention is shown. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, etc. The system 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the system 80 generally comprises hardware circuitry that is optimized to provide a high performance image processing and computer vision pipeline in minimal area and with minimal power consumption. In an example, various operations used to perform the image processing and/or the object detection for computer vision may be implemented using hardware modules designed to reduce computational complexity and use resources efficiently.

In an example embodiment, the system 80 generally comprises a block (or circuit) 82, a block (or circuit) 86, a memory bus 88 and/or a block (or circuit) 100. The circuit 82 may implement a processor. The circuit 86 may implement an external memory (e.g., a memory external to the circuit 100). The circuit 100 may implement a computer vision processor (or coprocessor). In one example, the computer vision processor 100 may be an intelligent vision processor. The system 80 may comprise other components (not shown). The number, type and/or arrangement of the components of the system 100 may be varied according to the design criteria of a particular implementation.

The circuit 82 may implement a processor circuit. In some embodiments, the processor circuit 82 may be a general purpose processor circuit. The processor circuit 82 may be operational to interact with the circuit 86 and the circuit 100 to perform various processing tasks.

The processor 82 may be configured as a controller for the circuit 100. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 100 and/or access results generated by components of the circuit 100. In one example, the processor 82 may be configured to re-rank ROI proposals based on a size of the ROI proposals and/or a feature map pyramid. In another example, the processor 82 may be configured to determine which feature map pyramid levels may be generated and which feature map pyramid levels may be omitted based on the ranked ROI proposals. In yet another example, the processor 82 may be configured to determine whether a ROI proposal uses a particular one of the feature maps generated by the circuit 100. The operations performed by the processor 82 may be varied according to the design criteria of a particular implementation.

In various embodiments, the circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 100.

The circuit 100 may implement a coprocessor circuit. In an example, the circuit 100 may be configured to implement various functionality used for computer vision. The coprocessor circuit 100 is generally operational to perform specific processing tasks as arranged by the processor circuit 82. In various embodiments, the coprocessor 100 may be implemented solely in hardware. The coprocessor 100 may directly execute a data flow directed to object detection with region of interest pooling, and generated by software that specifies processing (e.g., computer vision) tasks. In some embodiments, the circuit 100 may be a representative example of numerous computer vision coprocessors implemented by the system 80 configured to operate together.

The circuit 100 generally comprises a block (or circuit) 102, one or more blocks (or circuits) 104a-104n, a block (or circuit) 106 and a path 108. In an example embodiment, one or more of the circuits 104a-104n may comprise blocks (or circuits) 110a-100n. In the example shown, a block 110a and a block 110b are shown. In one example, the circuit 110a may implement a resampler. In another example, the circuit 110b may be configured to provide ROI pooling operations in accordance with an example embodiment of the invention (e.g., as part of an object detection process). In yet another example, one or more of the circuits 104c-104n may comprise a circuits 110c-110n (not shown) to provide convolution calculations in multiple dimensions. An example implementation of a convolution calculation scheme that may be used by one or more of the circuits 104a-104n may be found in co-pending U.S. application Ser. No. 15/403,540, filed Jan. 11, 2017, which is herein incorporated by reference in its entirety. The circuit 100 may be configured to receive ROI proposals that have been re-ranked by the processor 82 based on a feature map pyramid. The circuit 100 may be configured to generate decimated versions of a feature map on an as-needed basis and/or downsample a ROI proposal to a suitable feature map pyramid level to generate a final ROI output.

Multiple signals (e.g., OP A to OP N) may be exchanged between the circuit 102 and the respective circuits 104a-104n. Each signal OP A to OP N may convey execution operation information and/or yield operation information. Multiple signals (e.g., MEM A to MEM N) may be exchanged between the respective circuits 104a-104n and the circuit 106. The signals MEM A to MEM N may carry data. A signal (e.g., DRAM) may be exchanged between the circuit 86 and the circuit 106. The signal DRAM may transfer data between the circuits 86 and 106 (e.g., on the memory bus 88).

The circuit 102 may implement a scheduler circuit. The scheduler circuit 102 is generally operational to schedule tasks among the circuits 104a-104n to perform a variety of computer vision related tasks as defined by the processor circuit 82. Individual tasks may be allocated by the scheduler circuit 102 to the circuits 104a-104n. The scheduler circuit 102 may allocate the individual tasks in response to parsing a directed acyclic graph provided by the processor 82. The scheduler circuit 102 may time multiplex the tasks to the circuits 104a-104n based on the availability of the circuits 104a-104n to perform the work.

Each circuit 104a-104n may implement a processing resource (or hardware engine). The hardware engines 104a-104n are generally operational to perform specific processing tasks. The hardware engines 104a-104n may be implemented to include dedicated hardware circuits that are optimized for high-performance and low power consumption while performing the specific processing tasks. In some configurations, the hardware engines 104a-104n may operate in parallel and independent of each other. In other configurations, the hardware engines 104a-104n may operate collectively among each other to perform allocated tasks.

The hardware engines 104a-104n may be homogenous processing resources (e.g., all circuits 104a-104n may have the same capabilities) or heterogeneous processing resources (e.g., two or more circuits 104a-104n may have different capabilities). The hardware engines 104a-104n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 104a-104n may be implemented solely as hardware circuits. In some embodiments, the hardware engines 104a-104n may be implemented as generic engines that may be configured through circuit customization and/or software/firmware to operate as special purpose machines (or engines). In some embodiments, the hardware engines 104a-104n may instead be implemented as one or more instances or threads of program code executed on the processor 82 and/or one or more processors, including, but not limited to, a vector processor, a central processing unit (CPU), a digital signal processor (DSP), or a graphics processing unit (GPU). In some embodiments, one or more of the hardware engines 104a-104n may be selected for a particular process and/or thread by the scheduler 102. The scheduler 102 may be configured to assign the hardware engines 104a-104n to particular tasks in response to parsing a directed acyclic graph.

The circuit 106 may implement a shared memory circuit. The shared memory 106 may be configured to store data in response to input requests and/or present data in response to output requests (e.g., requests from the processor 82, the DRAM 86, the scheduler circuit 102 and/or the hardware engines 104a-104n). In an example, the shared memory circuit 106 may implement an on-chip memory for the computer vision coprocessor 100. The shared memory 106 is generally operational to store all of or portions of the multidimensional arrays (or vectors) of input data elements and output data elements generated and/or utilized by the hardware engines 104a-104n. The input data elements may be transferred to the shared memory 106 from the DRAM circuit 86 via the memory bus 88. The output data elements may be sent from the shared memory 106 to the DRAM circuit 86 via the memory bus 88.

The path 108 may implement a transfer path internal to the coprocessor 100. The transfer path 108 is generally operational to move data from the scheduler circuit 102 to the shared memory 106. The transfer path 108 may also be operational to move data from the shared memory 106 to the scheduler circuit 102.

The processor 82 is shown communicating with the computer vision coprocessor 100. The processor 82 may be configured as a controller for the computer vision coprocessor 100. In some embodiments, the processor 82 may be configured to transfer instructions to the scheduler 102. For example, the processor 82 may provide one or more directed acyclic graphs to the scheduler 102 and the scheduler 102 may initialize and/or configure the hardware engines 104a-104n in response to parsing the directed acyclic graphs. In some embodiments, the processor 82 may receive status information from the scheduler 102. For example, the scheduler 102 may provide a status information and/or readiness of outputs from the hardware engines 104a-104n to the processor 82 to enable the processor 82 to determine one or more next instructions to execute and/or decisions to make. In some embodiments, the processor 82 may be configured to communicate with the shared memory 106 (e.g., directly or through the scheduler 102, which receives data from the shared memory 106 via the path 108). The processor 82 may be configured to retrieve information from the shared memory 106 to make decisions. In an example, the processor 82 may be configured to compare a region of interest proposal to a feature map pyramid level stored in the shared memory 106. The instructions performed by the processor 82 in response to information from the computer vision coprocessor 100 may be varied according to the design criteria of a particular implementation.

Figure 2:
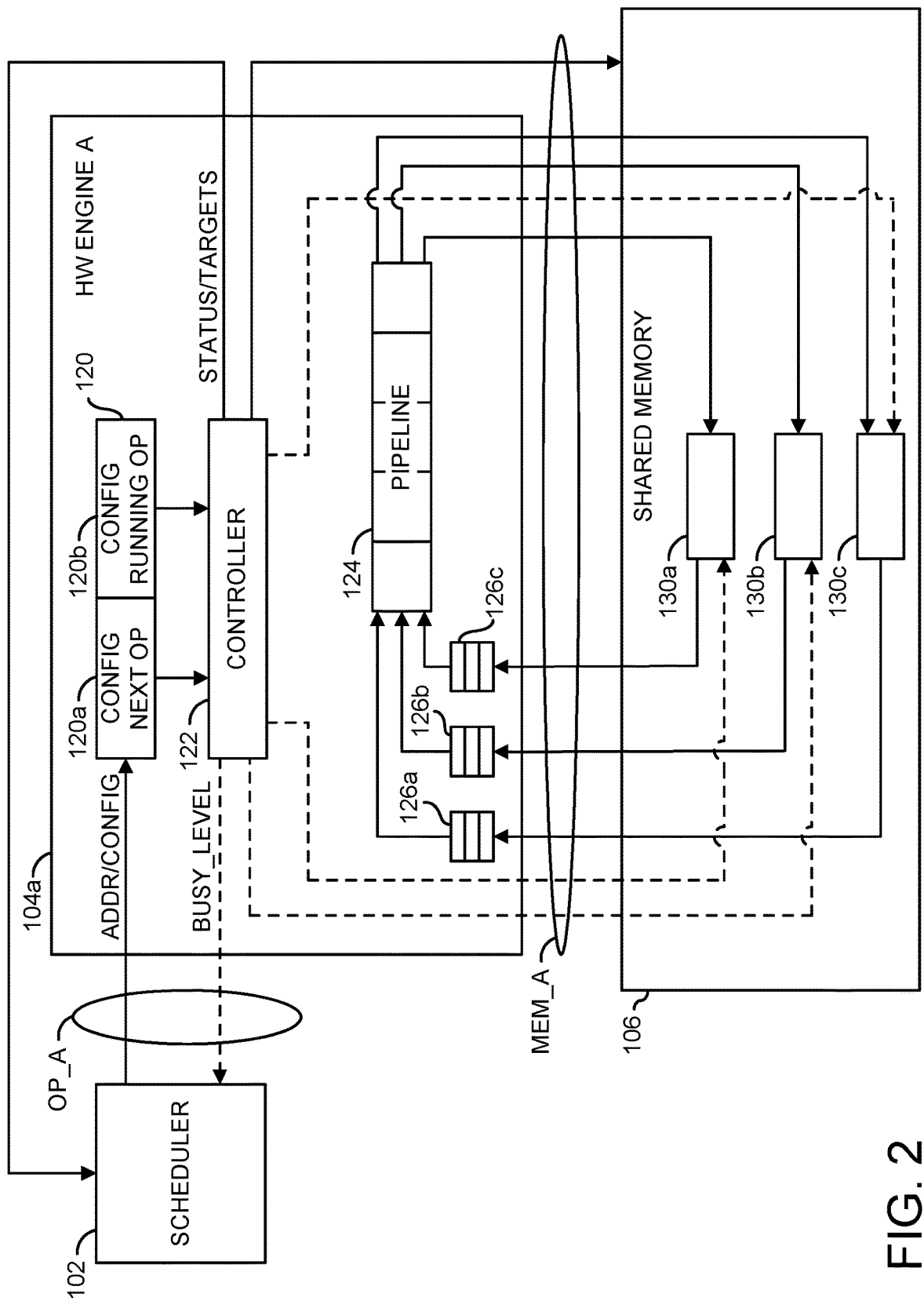
FIG. 2 is a block diagram illustrating an example hardware module configured to implement an efficient RoI Align.

Referring to FIG. 2, a block diagram illustrating an example hardware module configured to implement an efficient RoI Align is shown. The scheduler 102, the hardware engine 104a and the shared memory 106 are shown. The hardware engine 104a is shown as a representative example of one or more of the hardware engines 104a-104n.

The hardware engine 104a generally comprises a block (or circuit) 120, a block (or circuit) 122, a block (or circuit) 124, and a number of blocks (or circuits) 126a-126c. The circuit 120 may be implemented as a pair of memories (or buffers) 120a and 120b. The circuit 122 may implement a controller circuit. In an example, the circuit 122 may include one or more finite state machines (FSMs) configured to control various operators implemented by the hardware engine 104a. The circuit 124 may implement a processing pipeline of the hardware engine 104a. The circuits 126a-126c may implement first-in-first-out (FIFO) memories. The circuits 126a-126c may be configured as input buffers for the processing pipeline 124. The shared memory 106 may be configured (e.g., by signals from the circuit 122) as multiple storage buffers 130a-130c. In the example shown, the controller 122 may be configured to allocate three storage buffers 130a-130c in the shared memory 106. While the buffers 130a-130c are shown, other buffers and/or storage locations in the shared memory 106 may be utilized by the hardware engine 104a (e.g., output buffers).

A signal (e.g., ADDR/CONFIG) may be generated by the scheduler circuit 102 and received by the hardware engine 104a. The signal ADDR/CONFIG may carry address information and configuration data. The signal ADDR/CONFIG may be generated by the scheduler 102 in response to parsing the directed acyclic graph received from the processor 82. A signal (e.g., BUSY LEVEL) may be generated by the circuit 122 and transferred to the scheduler circuit 102. The signal BUSY LEVEL may convey the busy level of the hardware engine 104a. A signal (e.g., STATUS/TARGETS) may be generated by the circuit 122 and transferred to the scheduler circuit 102. The signal STATUS/TARGETS may provide status information regarding the hardware engine 104a and target information for the operands. The signal BUSY LEVEL and/or the signal STATUS/TARGETS may provide information to the scheduler 102 about the availability and/or readiness of the hardware engine 104a.

In an example embodiment, the buffers 120a and 120b may be configured as a double-banked configuration buffer. The double-banked buffer may be operational to store configuration information for a currently running operation in one buffer (e.g., the buffer 120b) while configuration information for a next operation is being moved into the other buffer (e.g., the buffer 120a). The scheduler 102 generally loads operator configuration information, including status words in a case where the operator has been partially processed in previous operator chunks, into the double-banked buffer. Once the circuit 122 is finished with the configuration information of the running operation and the configuration information for the next operation has been received, the buffers 120a and 120b may swapped.

The circuit 122 generally implements the control circuitry of the hardware engine 104a. The circuit 122 determines when to switch from the currently running operator to the new operator. The controller 122 is generally operational to control the movement of information into, out of, and internal to the hardware engine 104a. In general, the operation of the hardware engine 104a is pipelined. During an operator switch, a front end of the pipeline 124 may already be working on data for the new operator while a tail-end of the pipeline 124 is still finishing up the processing associated with old operator.

The circuit 124 may implement a pipeline circuit. The pipeline circuit 124 is generally operational to process operands received from the shared memory 106 using functionality designed into the hardware engine 104a. The circuit 124 may communicate data resulting from the functions performed by the hardware engine 104a to the one or more shared buffers 130a-130c.

The buffers 126a-126n may implement FIFO buffers. The FIFO buffers 126a-126n may be operational to store operands received from the storage buffers 130a-130c for processing in the pipeline 124. In general, the number of FIFO buffers and the number of shared buffers implemented may be varied to meet the design criteria of a particular application.

The controller 122 may be configured to allocate storage in the on-chip memory 106. In an example, the processor 82 may provide instructions to the schedule 102 and the scheduler 102 may generate the signal OPA for the controller 122. The controller 122 may allocate memory space in the shared memory 106 in response to the instructions received from the scheduler 102. The three storage buffers 130a-130c may be allocated. The three storage buffers 130a-130c may be configured to store the feature map pyramid levels. The feature map pyramid levels may be stored in the storage buffers 130a-130c in a pattern. Storing the feature map pyramid levels in the pattern may enable the hardware engine 104a to generate the feature map levels on the fly. The feature map pyramid levels may be discarded from the storage buffers 130a-130c when no longer needed.

The storage buffers 130a-130c may be configured to store all the needed feature map pyramid levels. However, all of the feature map pyramid levels may not be generated at once. By generating the feature map pyramid levels on an as-needed basis, and storing each of the feature map pyramid levels in the storage buffers 130a-130c until all feature map levels that are dependent on a stored feature map level are generated, all of the needed feature map pyramid levels may be stored within the size constraints of the storage buffers 130a-130c.

The storage buffers 130a-130c may each have a different size (e.g., storage capacity). The controller 122 may be configured to allocate roughly a size of FMAP+½FMAP+¼FMAP in the on-chip memory 106 for the storage buffers 130a-130c. The size FMAP may be the size of a full resolution feature map of an input image (or video frame). In an example, the storage buffer 130a may have a size of FMAP (e.g., the largest size of the storage buffers 130a-130c), the storage buffer 130b may have a size of ½FMAP (e.g., the intermediate size of the storage buffers 130a-130c) and the storage buffer 130c may have a size of ¼FMAP (e.g., the smallest size of the storage buffers 130a-130c). The size ½FMAP may be half the size of the full resolution feature map (e.g., half the size of a padded version of the full resolution feature map when the full resolution feature map has an odd number of rows/columns). The size ¼FMAP may be a quarter the size of the full resolution feature map (e.g., a quarter the size of a padded version of the full resolution feature map when the full resolution feature map has an odd number of rows/columns).

The storage buffers 130a-130c may be repetitively re-used in the pattern to store all of the needed pyramid levels. The pattern may comprise alternating the storage of the generated feature map pyramid levels among the storage buffers 130a-130c. The pattern may be configured to avoid over-writing data that is still needed to generate dependent feature map pyramid levels (e.g., only data that is no longer needed may be discarded and/or over-written). The pattern may be configured to ensure that each decimated pyramid level generated may be stored in a next available one of the storage buffers 130a-130c according to the pattern of storage. By discarding the pyramid levels that are no longer needed (e.g., to create dependent levels), the three storage buffers 130a-130c may be repeatedly re-used to store the pyramid levels as the pyramid levels are generated (e.g., pyramid levels may be generated on an as-needed basis).

Referring to FIG. 3, a block diagram illustrating a memory flow of the on-chip memory is shown. Portions of the computer vision coprocessor 100 are shown. Input and/or output for the computer vision operator 104a and the on-chip memory 106 are shown.

Feature map levels 150a-150c are shown. The feature map levels 150a-150c may be example feature map levels of a feature map pyramid. In the example shown, a first three levels 150a-150c of the feature map pyramid are shown. The feature map pyramid may comprise n levels (e.g., 150a-150n, not shown). One or more of the levels of the feature map pyramid 150a-150n may be stored by the storage buffers 130a-130c. The feature map pyramid 150a-150n may comprise different decimations of the original feature map (e.g., the feature map level 150a).

Blocks 152a-152n are shown. The blocks 152a-152n may represent ranked region of interest (ROI) proposals. In some embodiments, the ROI proposals may be generated by a region proposal generator (e.g., one or more of the resources 104b-104n may implement a region proposal generator). The ROI proposals generated may be stored in the DRAM 86. The processor 82 may be configured to rank the ROI proposals. The processor 82 may be configured to rank the ROI proposals based on a size of the ROI proposals and/or a feature map pyramid. The ranked ROI proposals 152a-152n may be stored in a stack memory of the processor 82 (e.g., the DRAM 86 and/or a dedicated stack memory for the processor 82). The stack memory may present one of the ranked ROI proposals 152a-152n to the shared memory 106. The shared memory 106 may store the ranked ROI proposals 152a-152n (e.g., one at a time).

A blocks 154 is shown in the memory 106. The block 154 may represent one of the ranked ROI proposals 152a-152n stored in the shared memory 106. The ROI proposal 154 may be used by the processor 82 to determine whether the feature maps 150a-150n are used by the ranked ROI proposals 152a-152n. If one of the ranked ROI proposals 152a-152n use one of the feature map levels 150a-150n, then the shared memory 106 may present the ROI proposal 154 to the computer vision operator 104a. The resampler 110a may downsample the ROI proposal 154 on the feature pyramid level to generate a final ROI output.

The feature map 150a may be the full resolution feature map (e.g., FMAP_0). The full resolution feature map 150a may be a source (e.g., parent) for the other feature map levels of the feature map pyramid 150a-150n (e.g., the levels of the feature map pyramid 150a-150n may be generated starting from the full resolution feature map 150a). Each of the levels of the feature map pyramid 150a-150n may not be generated directly from the full resolution feature map 150a. For example, the pyramid level 150b (e.g., FNAP_N) may be generated directly from the full resolution feature map 150a and the pyramid level 150c (e.g., FMAP_N+1) may be generated directly from the feature map 150b (e.g., but not directly from the full resolution feature map 150a).

The full resolution feature map 150a may be received by the on-chip memory 106. The full resolution feature map 150a may be provided to the on-chip memory 106 from the DRAM 86. For example, the full resolution feature map 150a may be communicated as the signal DRAM on the memory bus 88.

An input image may be forwarded through several convolution layers (e.g., a CNN) to generate a convolutional feature map of size C×H×W, where C, H and W denote the depth (i.e. number of channels), height and width of the feature map. The feature map generated may be the full resolution feature map 150a. The full resolution feature map 150a may be stored in the DRAM 86. The full resolution feature map 150a may be used by other steps and/or methods in the computer vision process. The full resolution feature map 150a may be input to one or more of the hardware engines 104a-104n. In some embodiments, the RoI Align operation performed by the computer vision operator 104a may be performed subsequent to other computer vision methods performed by the computer vision operators 104a-104n and/or in parallel with other computer vision methods performed by the computer vision operators 104a-104n.

The computer vision operator 104a may be configured to construct the feature map pyramid 150a-150n from a convolution feature map (e.g., the full resolution feature map 150a). The processor 82 may be configured to assign the ranked ROI proposals 152a-152n to the various feature map levels in the feature map pyramid 150a-150n. In various embodiments, a whole input image is generally forwarded through several convolution layers to generate a convolutional feature map pyramid 150a-150n. The feature map pyramid 150a-150n generally comprises an original feature map 150a and a plurality of scaled feature maps. The original feature map 150a generally is of size C×H×W, where C, H, and W denote the depth (e.g., number of channels), height, and width of the original feature map. The plurality of scaled feature maps (e.g., 6, 9, etc.) are generated from the original feature map 150a-150n, for example, by power of two down-sampling. The feature map pyramid 150a-150n may be constructed from the original full resolution feature map 150a. The feature map pyramid 150a-150n may provide a scale space to ensure that a down-sampling process (e.g., using interpolation hardware, such as bilinear interpolation hardware) down-samples a cropped feature map (e.g., by no more than 2× in either the width or height dimension).

In one example, one of the hardware engines 104a-104n may be configured as a region proposal generator. The region proposal generator may be configured to output a set of ROI proposals of objects within an image. In some embodiments, the region proposal generator may be an external proposal method and/or an internal sub-network. The ROI proposal 154 may be presented as an input to the computer vision operator 104a.

The original feature map 150a may be used as input to a region proposal generator. In various embodiments, the region proposal generator may be an external proposal method or internal sub-network. The region proposal generator may be implemented using conventional and/or proprietary techniques. The region proposal generator is generally configured to output a set of proposals of objects (e.g., regions of interest) within the input image (e.g., illustrated on the original image space). The proposals/ROIs may be of non-uniform sizes. In various embodiments, the proposal/ROI 154 received by the computer vision operator 104a from the region proposal generator are generally projected onto corresponding feature maps of the feature map pyramid 150a-150n based on predetermined criteria (e.g., minimizing resampling computations, etc.). The RoI Align operation, in accordance with an embodiment of the invention, is performed on each ranked proposal/ROI 152a-152n received to produce a fixed-size feature map for each region proposal.

Each fixed-size feature map is generally fed to a subsequent per-proposal (per-ROI) sub-network (e.g. a region-based convolutional neural network, or R-CNN) or process for object classification (e.g. car, pedestrian, or cyclist) and bounding box regression/refinement. An example of a region-based convolutional network method may be found in R. Girschick, "Fast R-CNN," in IEEE International Conference on Computer Vision (ICCV), 2015, and in K. He, "Mask R-CNN" in Facebook AI Research (FAIR), Jan. 24, 2018, which appropriate portions of each are herein incorporated by reference. In an example, the result of the region of interest pooling may be used to classify objects in an environment around a vehicle and in providing at least one of a warning to a driver of the vehicle or an adjustment to at least one of a drive train, a steering mechanism, or a braking system of the vehicle.

The input ranked ROI proposals 152a-152n may comprise coordinates of bounding boxes corresponding to the full resolution feature map 150a. In one example, the coordinates may be in the form of [x0,y0,x1,y1], where x0,y0 comprise coordinates of an upper left corner of one of the ROI proposal bounding boxes, and x1,y1 comprise coordinates of a lower right corner of one of the same ROI proposal bounding box. Other formats for coordinates may be implemented. The list of ROIs may be pre-generated by a region-proposal network before running the RoI Align method. For example, the ROI proposals may be post-processed by non-maximum suppression to reduce the number of candidates by one or more of the hardware engines 104a-104n.

To enable the apparatus 100 to perform the efficient RoI Align method, the processor 82 may be configured to re-rank all the input ROI proposals. The ROI proposals may be ranked in an order of pyramid levels needed. The processor 82 may be configured to pre-calculate all initial phase and phase increment values needed for interpolation. From the list of input ROIs, the processor 82 may calculate a size of each ROI bounding box (e.g., based on the x0,y0,x1,y1 values). The size of ROI bounding box may be used to re-rank (e.g., or cluster) the ROI candidates. Generally, the ROI proposals with larger bounding boxes may correspond to smaller features map levels in the feature map pyramid 150a-150n, and ROI proposals with smaller bounding boxes may correspond to larger feature map levels in the pyramid in the feature map pyramid 150a-150n.

The ranked ROI proposals 152a-152n may be stored in the stack memory of the processor 82. In one example, the stack memory for the processor 82 may be cached DRAM 86. In another example the system 80 may comprise a dedicated stack memory attached to the processor 82. The ranked ROI proposals 152a-152n may be presented to the shared memory 106 (e.g., the ROI proposal 154). For example, the processor 82 may be configured to program a size and position of one of the ROI proposals 152a-152n to the computer vision coprocessor 100. The ranked ROI proposal 154 may be stored in the shared memory 106 and presented to the computer vision operator 104a. The processor 82 may be configured to request the computer vision coprocessor 100 to generate the pooled ROI output. A direct memory access of the output to the DRAM 86 may be performed.

The processor 82 may assign each of the ranked ROI proposals 152a-152n to a corresponding feature map of the feature map pyramid 150a-150n. In various embodiments, the assignment may be made based on predetermined criteria (e.g., to minimize an amount of re-sampling computation performed, etc.). In an example, the assignment may be made using the following pair of equations:

$$s_w = 2\left[\log 2\left(\frac{w}{f_x w_t}\right)\right] \text{ and} \quad (1)$$

$$s_h = 2\left[\log 2\left(\frac{h}{f_h h_t}\right)\right],$$

where $s_w$ and w denote the downsizing factor along the width dimension and width of the ROI in the image space respectively, $f_w$ denotes the feature stride in the width dimension (e.g., 16 means the feature map is downsized 16× from the original image in the width dimension), $w_t$ denotes the target width of the per-ROI feature map (e.g. 7, etc.), $s_h$ and h denote the downsizing factor along the height dimension and height of the ROI in the image space respectively, $f_h$ denotes the feature stride in the height dimension (e.g., 16 means the feature map is downsized 16× from the original image in the height dimension), and $h_t$ denotes the target height of the per-ROI feature map (e.g. 7, etc.).

The resampler 110a may be configured to generate the needed levels of the feature map pyramid 150a-150n. The levels may be generated by decimating levels of the feature map pyramid 150a-150n in the neural network coprocessor 100. In an example, the full resolution feature map 150a may be an initial level that may be decimated by the resampler 110a to generate a next level. Then the next level may be decimated by the resampler 110a to generate another level, etc. The number of levels generated and/or the amount of decimation performed in each direction may be varied according to the design criteria of a particular implementation. A key criteria is a last stage resampling performed by the resampler 110a may not down sample more than 2×.

The processor 82 may be configured to find a most suitable feature map level (e.g., a closest match) in the feature map pyramid 150a-150n that fits the current group of ROI proposals 152a-152n. Generally, building the feature map pyramid 150a-150n of decimated versions of feature maps and then choosing the closest pyramid level to do a final decimation is better than directly applying an interpolation operation in one step. For example, directly applying a bilinear interpolation in once step may introduce extra bandwidth and/or spatial aliasing. The computer vision operator 104a may build the feature map pyramid 150a-150n through repetitively interpolating (e.g., either width or height by a factor of 2) in order to ensure that the last interpolation operation decimates less than a factor of 2. The interpolation operation performed may generate the next level (e.g., the dependent level) of the feature map pyramid 150a-150n.

In one example, the interpolation operation implemented by the computer vision operator 104a may be a bilinear interpolation. In another example, the interpolation operation may be a nearest-neighbor interpolation. In yet another example, the interpolation operation may be a polyphase interpolation. The type of interpolation operation implemented may be varied according to the design criteria of a particular implementation.

A block (or circuit) 160 is shown. Blocks 170a-170n are shown. The block 160 may implement an output buffer. The output buffer 160 may be implemented (e.g., allocated) in the on-chip memory 106. The blocks 170a-170n may represent final output ROIs generated by the computer vision operator 104a.

The output buffer may be configured to receive a final output ROI from the resampler 110a. The resampler 110a may be configured to project the region of interest proposal onto the selected (e.g., suitable) pyramid level determined by the processor 82. The resampler 110a may be configured to further downsample the region of interest proposal projected onto the suitable pyramid level to generate the final ROI output (e.g., one of the final ROIs 170a-170n). The final ROI output may be presented to the output buffer 160. The output buffer may present the final output ROIs 170a-170n to the DRAM 86. In an example, the signal DRAM on the memory path 88 may communicate the final output ROIs 170a-170n.

An example data flow is shown. The full resolution feature map 150a may be stored in the on-chip memory 106 (e.g., in the first storage buffer 130a). In the example shown, in a first iteration, the full resolution feature map 150a may be stored as the feature map FMAP_N 150b. The feature map FMAP_N 150b may be communicated to the resampler 110a. The processor 82 may determine whether the feature map FMAP_N is necessary (e.g., is needed for the ROI proposals 152a-152n or for generating a dependent level). If the feature map FMAP_N is needed for the ROI proposals 152a-152n, the resampler 110a may generate the final output ROI (e.g., one of the final output ROIs 170a-170n) and present the final output ROI to the output buffer 160.

If the feature map FMAP_N is needed for generating a dependent feature map level, then the resampler 110a may generate the dependent level (e.g., ½FMAP_N). The dependent level ½FMAP_N 150b may be presented to the on-chip memory 106. In an example, when the full resolution feature map 150a is the feature map FMAP_N, the dependent level ½FMAP_N may be generated.

The feature map ½FMAP_N 150b may be the feature map FMAP_N+1 (e.g., the next input to the resampler 110a). For example, after the previous level has been processed (e.g., the feature map FMAP_N), then the next level (e.g., the feature map FMAP_N+1) may be used as the input. In an example, in a next step the feature map ½FMAP_N may be the input FMAP_N.

The feature map FMAP_N 150b and the feature map ½FMAP_N may be stored in the buffers 130a-130b. For example, when the feature map FMAP_N is the full resolution feature map 150a, the full resolution feature map 150a may be stored in the storage buffer 130a and the feature map ½FMAP_N (e.g., the full resolution feature map 150a decimated in the x direction) output by the resampler 110a may be stored in the storage buffer 130b. The full resolution feature map 150a may be stored in the storage buffer 130a until all dependent levels in the x direction that are needed are generated. Then the full resolution feature map 150a may be used as the feature map FMAP_N again and the resampler 110a may decimate the full resolution feature map 150a in the y direction. The full resolution feature map 150a may then be discarded from the on-chip memory 106.

Figure 4:
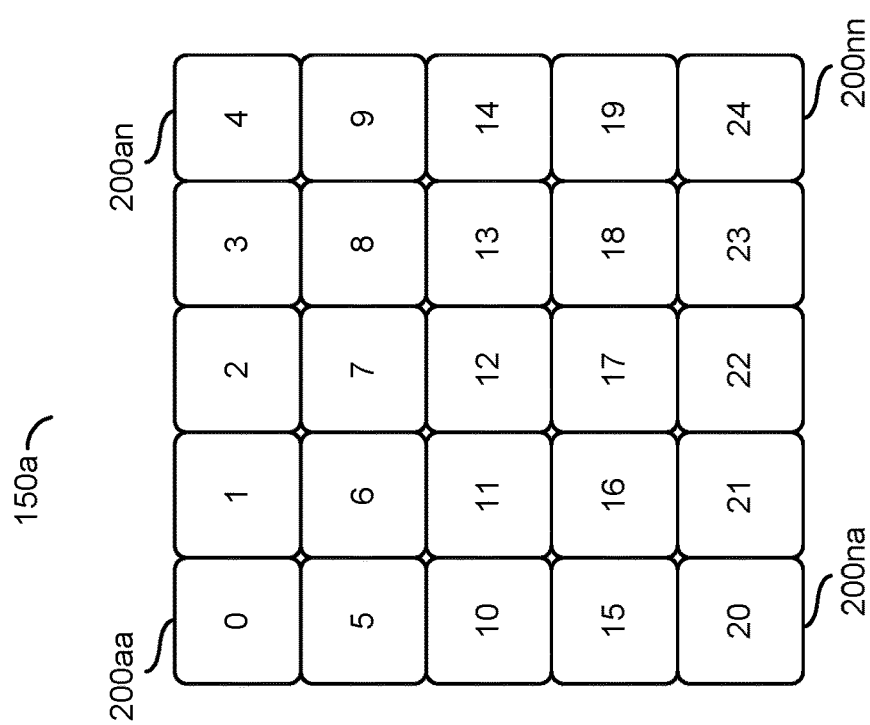
FIG. 4 is a diagram illustrating an example full resolution feature map.

Referring to FIG. 4, a diagram illustrating an example full resolution feature map is shown. The full resolution feature map 150a is shown. The full resolution feature map 150a may be generated by forwarding an input image through several convolution layers. The full resolution feature map 150a may be received by the computer vision operator 104a from the external DRAM memory 86.

The full resolution feature map 150a may comprise pooling cells 200aa-200nn. The cells 200aa-200nn may comprise values corresponding to a mapping of where a particular feature may be found in an image. For example, a higher value (e.g., higher activation) may indicate that a particular feature has been found. The values of the cells 200aa-200nn may correspond to output activations for a particular filter applied to an input image.

In the example shown, the full resolution feature map 150a may be a 5×5 feature map. Example activation values (e.g., in order by row, 0 through 24) are shown for illustrative purposes. The resampler 110a may be configured to downsample the full resolution feature map 150a by width and/or by height to generate dependent levels for the feature map pyramid 150a-150n.

Generally, the object detection architecture implemented by the computer vision coprocessor 100 may comprise two stages. One stage may comprise generating the ROI proposals. In an example, for a particular input image, the computer vision coprocessor 100 may be configured to determine possible locations of the image where a particular object may be found. The output of determining the ROI proposals may be a list of bounding boxes of likely positions of objects (e.g., the region proposals, the regions of interest, etc.). The method of determining the ROI proposals may be varied according to the design criteria of a particular implementation. A final classification stage may be implemented to determine whether the ROI proposal belongs to one of the target classes or to the background. The processor 82 may be configured to rank the ROI proposals. The processor 82 may temporarily store the ranked ROI proposals 152a-152n in a stack memory of the processor 82. In some embodiments, the stack memory of the processor 82 may be the DRAM 86. In some embodiments, the processor 82 may be implemented having a dedicated stack memory (e.g., an attached dedicated stack memory). For each ranked region of interest proposal 152a-152n, the processor 82 may be configured to program a position and size of the region of interest proposal 154 to the computer vision coprocessor 100. The processor 82 may be configured to request the computer vision coprocessor 100 to generate the pooled region of interest output and directly DMA the output to the DRAM 86. In an example, the apparatus 80 may be configured to implement a RoI Align operation for a two-stage object detection.

A region of interest proposal may be plotted on the full resolution feature map 150a. Generally, the boundaries of the ranked ROI proposals 152a-152n may not align with a granularity of feature maps. For example, the ROI proposal 154 may have coordinates generated with respect to the original input image and the feature maps 150a-150n may have a lower resolution than the input image. The RoI Align operations performed by the processor 82 and/or the computer vision operator 104a may be configured to select sample points from the feature map for a bin of the ROI proposal 154, perform an interpolation operation to calculate a feature value at the sample points and perform a pooling operation (e.g., an average) for each sample point in a particular bin of the ROI proposal 154. By performing the operations for each bin of the ROI proposal 154, a final output ROI may be generated having the same dimensions for each of the output ROIs 170a-170n.

Figure 5:
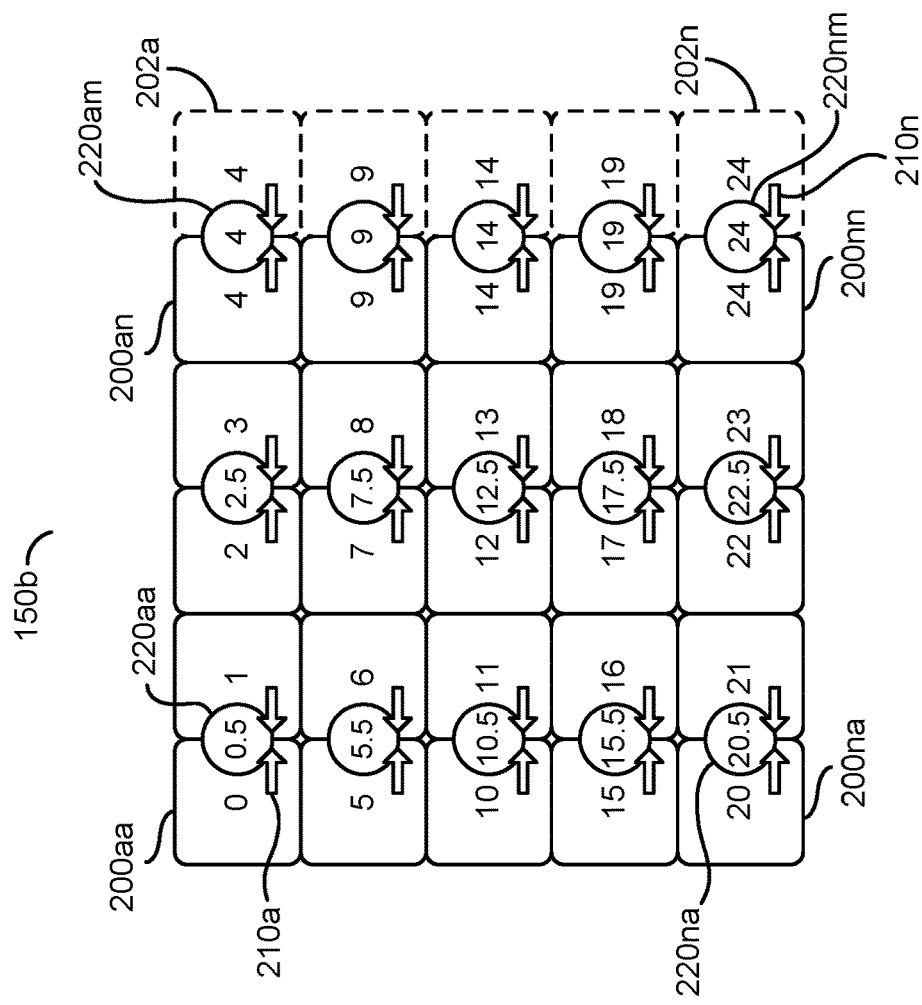
FIG. 5 is a diagram illustrating a dependent feature map level downsampled in the X direction.

Referring to FIG. 5, a diagram illustrating a dependent feature map level downsampled in the X direction is shown. The feature map 150b may be generated by downsampling the width of the full resolution feature map 150a once (e.g., downsample the x axis). The cells 200aa-200nn are shown having the activation values from the full resolution feature map 150a to illustrate the generation of the dependent feature map 150b.

In the example shown, the full resolution feature map 150a may be a 5×5 feature map. The 5×5 feature map may comprise an odd number of values in the x direction (e.g., an odd number of columns). Padded cells 202a-202n are shown. The padded cells 202a-202n may be added to each of the rows of the full resolution feature map 150a so that there may be an even number of values horizontally to perform the downsampling. The padded cells 202a-202n may be used to calculate a next pyramid level but may not be directly applied to the feature maps 150a-150n. The padded cells 202a-202n may not be accommodated to memory. The activation values used for the padded cells 202a-202n may be the same activation value as the activation value of the last cells 200an-200nn of each row of the full resolution feature map 150a.

The resampler 110a may be configured to perform downsampling operations 210a-210n. The downsampling operations 210a-210n may comprise averaging the activation values 200aa-200nn (and the padded values 202a-202n, when applicable) horizontally. For example, to perform the 2× downsampling in the x direction, the average value may be determined for two horizontally adjacent activation values.

Values 220aa-220nn are shown. The values 220aa-220nn may comprise the downsampled values. The downsampled values 220aa-220nn may be the values of the dependent feature map 150b. In an example, the downsampled value 220aa may be 0.5 (e.g., an average of the two adjacent values 0 and 1 of the full resolution feature map 150a). In another example, the downsampled value 220nn may be 24 (e.g., an average of the activation value 200nn and the same padded value 202n).

The dependent feature map 150b may comprise fewer downsampled values 220aa-220nm than the number of values of the source feature map (e.g., the full resolution feature map 150a, in the example shown). In the example shown, the dependent feature map 150b may be a 5×3 feature map. The dependent feature map 150b may have the same number of rows but fewer columns for the downsampled values 220aa-220nm. The dependent feature map 150b may be considered half the size of the source feature map 150a. For example, the source feature map may comprise 25 values and 30 values including the padded cells 202a-202n. The dependent feature map 150b may comprise 15 cells (e.g., ½FMAP). In an example, if the full resolution feature map 150a is stored in the storage buffer 130a having the size FMAP (e.g., allocated in the shared memory 106 to fit 25 cells), then the dependent feature map 150b may be stored in the storage buffer 130b having the size ½FMAP (e.g., allocated in the shared memory 106 to fit 15 cells).

In the example shown, the downsampling operations 210a-210n are shown performed with respect to the full resolution feature map 150a. However, the downsampling operations may not always be performed with respect to the full resolution feature map 150a. For example, the dependent feature map 150b may be further downsampled in the x direction (e.g., based on the downsampled values 220aa-220nm) to generate a feature map that is dependent on the dependent feature map 150b.

Referring to FIG. 6, a diagram illustrating a dependent feature map level downsampled in the Y direction is shown. The feature map 150c may be generated by downsampling the height of the full resolution feature map 150a once (e.g., downsample the y axis). The cells 200aa-200nn are shown having the activation values from the full resolution feature map 150a to illustrate the generation of the dependent feature map 150c.

In the example shown, the full resolution feature map 150a may be a 5×5 feature map. The 5×5 feature map may comprise an odd number of values in the y direction (e.g., an odd number of rows). Padded cells 202a'-202n' are shown. The padded cells 202a'-202n' may be added to each of the columns of the full resolution feature map 150a so that there may be an even number of values vertically to perform the downsampling. The padded cells 202a'-202n' may be used to calculate a next pyramid level but may not be directly applied to the feature maps 150a-150n. The padded cells 202a'-202n' may not be accommodated to memory. The activation values used for the padded cells 202a'-202n' may be the same activation value as the activation value of the last cells 200na-200nn of each column of the full resolution feature map 150a.

The resampler 110a may be configured to perform downsampling operations 210a'-210n'. The downsampling operations 210a'-210n' may comprise averaging the activation values 200aa-200nn (and the padded values 202a'-202n', when applicable) vertically. For example, to perform the 2× downsampling in the y direction, the average value may be determined for two vertically adjacent activation values.

Values 220aa'-220mn' are shown. The values 220aa'-220mn' may comprise the downsampled values. The downsampled values 220aa'-220mn' may be the values of the dependent feature map 150c. In an example, the downsampled value 220aa' may be 2.5 (e.g., an average of the two adjacent values 0 and 5 of the full resolution feature map 150a). In another example, the downsampled value 220mn' may be 24 (e.g., an average of the activation value 200nn and the same padded value 202n').

The dependent feature map 150c may comprise fewer downsampled values 220aa'-220mn' than the number of values of the source feature map (e.g., the full resolution feature map 150a, in the example shown). In the example shown, the dependent feature map 150c may be a 3×5 feature map. The dependent feature map 150c may have the same number of columns but fewer rows for the downsampled values 220aa'-220mn'. The dependent feature map 150c may be considered half the size of the source feature map 150a. For example, the source feature map may comprise 25 values and 30 values including the padded cells 202a'-202n'. The dependent feature map 150c may comprise 15 cells (e.g., ½FMAP). In an example, if the full resolution feature map 150a is stored in the storage buffer 130a having the size FMAP (e.g., allocated in the shared memory 106 to fit 25 cells), then the dependent feature map 150b may be stored in the storage buffer 130b having the size ½FMAP (e.g., allocated in the shared memory 106 to fit 15 cells).

In the example shown, the downsampling operations 210a'-210n' are shown performed with respect to the full resolution feature map 150a. However, the downsampling operations may not always be performed with respect to the full resolution feature map 150a. For example, the dependent feature map 150c may be further downsampled in the y direction and/or the x direction (e.g., based on the downsampled values 220aa'-220mn') to generate a feature map that is dependent on the dependent feature map 150c.

Referring to FIG. 7, a diagram illustrating a dependent feature map level downsampled in an X and Y direction is shown. The feature map 150d may be generated by downsampling the full resolution feature map 150a (e.g., downsample the x axis and downsample the y axis), downsampling the height of the dependent feature map 150b (e.g., downsample the y axis), or downsampling the width of the dependent feature map 150c (e.g., downsample the x axis). The cells 200aa-200nn are shown having the activation values from the full resolution feature map 150a to illustrate the generation of the dependent feature map 150d.

In the example shown, the full resolution feature map 150a may be a 5×5 feature map. The 5×5 feature map may comprise an odd number of values in the x direction (e.g., an odd number of columns) and an odd number of values in the y direction. Padded cells 202a-202n, padded cells 202a'-202n' and a padded cell 202" are shown. The padded cells 202a-202n and the padded call 202" may be added to each of the rows of the full resolution feature map 150a so that there may be an even number of values horizontally to perform the downsampling. The padded cells 202a'-202n' and the padded cell 202" may be added to each of the columns of the full resolution feature map 150a so that there may be an even number of values vertically to perform the downsampling. The padded cells 202a-202n, the padded cells 202a'-202n' and the padded cell 202" may be used to calculate a next pyramid level but may not be directly applied to the feature maps 150a-150n. The padded cells 202a-202n, the padded cells 202a'-202n' and the padded cell 202" may not be accommodated to memory. The activation values used for the padded cells 202a-202n may be the same activation value as the activation value of the last cells 200an-200nn of each row of the full resolution feature map 150a. The activation values used for the padded cells 202a'-202n' may be the same activation value as the activation value of the last cells 200na-200nn of each column of the full resolution feature map 150a. The activation value used for the padded cell 202" may be the same activation value of the cell 200nn.

The resampler 110a may be configured to perform downsampling operations 210a"-210n". The downsampling operations 210a"-210n" may comprise averaging the activation values 200aa-200nn (and the padded values 202a-202n, the padded values 202a'-202n' and the padded value 202") horizontally and vertically. For example, to perform the 2× downsampling in the x direction and the 2× downsampling in the y direction, the average value may be determined for a group of 4 of the activation values 200aa-200nn (e.g., a 2×2 group).

Values 220aa"-220mm" are shown. The values 220aa"-220mm" may comprise the downsampled values. The downsampled values 220aa"-220mm" may be the values of the dependent feature map 150d. In an example, the downsampled value 220aa" may be 3 (e.g., an average of the 2×2 group of values 0, 1, 5 and 6 of the full resolution feature map 150a). In another example, the downsampled value 220mm" may be 24 (e.g., an average of the activation value 200nn and the same padded values 202n, 202n' and 202").

The dependent feature map 150d may comprise fewer downsampled values 220aa"-220mm" than the number of values of the source feature map (e.g., the full resolution feature map 150a, in the example shown, the dependent feature map 150b and the dependent feature map 150c). In the example shown, the dependent feature map 150d may be a 3×3 feature map. The dependent feature map 150d may have the same number of fewer columns and fewer rows for the downsampled values 220aa"-220mm". The dependent feature map 150d may be considered a quarter of the size of the source feature map 150a (e.g., and a half size of the dependent feature map 150b if the dependent feature map 150b is the source and a half size of the dependent feature map 150c if the dependent feature map 150c is the source). For example, the full resolution feature map 150a may comprise 25 values and 36 values including the padded cells 202a-202n, 202a'-202n' and the padded cell 202". The dependent feature map 150b may comprise 15 values and 18 values including padding. The dependent feature maps 150c may each comprise 15 values and 18 values including padding. The dependent feature map 150d may comprise 9 cells (e.g., ¼FMAP). In an example, if the full resolution feature map 150a is stored in the storage buffer 130a having the size FMAP (e.g., allocated in the shared memory 106 to fit 25 cells) and the dependent feature map 150c is stored in the storage buffer 130b having the size ½FMAP (e.g., allocated in the shared memory 106 to fit 15 cells), then the dependent feature map 150d may be stored in the storage buffer 130c having the size ¼FMAP (e.g., allocated in the shared memory 106 to fit 9 cells).

In the example shown, the downsampling operations 210a"-210n" are shown performed with respect to the full resolution feature map 150a. However, the downsampling operations may not always be performed with respect to the full resolution feature map 150a. For example, the dependent feature map 150d may be further downsampled in the x direction (e.g., based on the downsampled values 220aa"-220mm") to generate a feature map that is dependent on the dependent feature map 150d.

Figure 8:
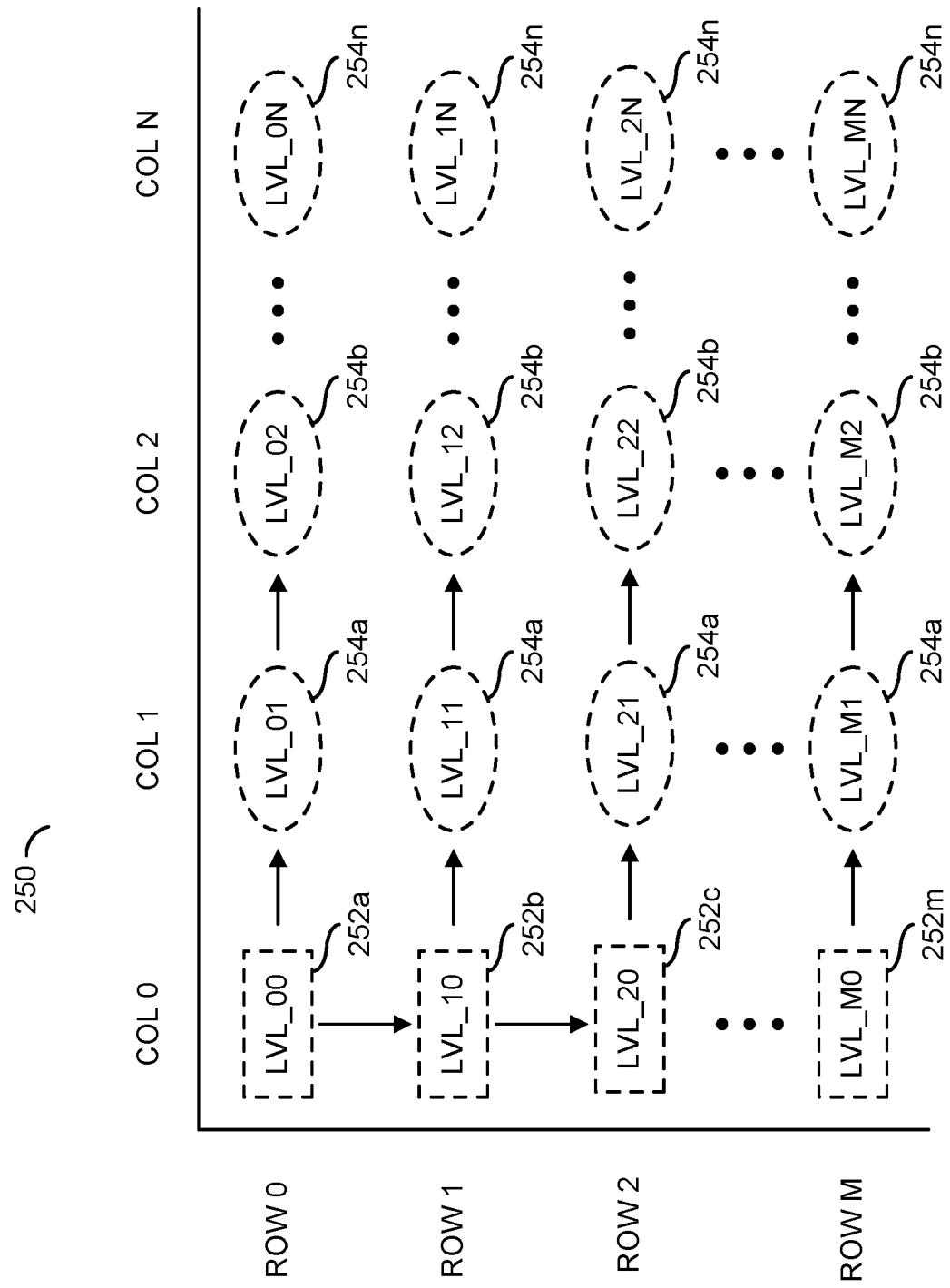
FIG. 8 is a diagram illustrating pyramid level dependencies.

Referring to FIG. 8, a diagram illustrating pyramid level dependencies is shown. A table 250 is shown. The table 250 may be an illustrative example of the dependency relationship among all pyramid levels of the feature map pyramid 150a-150n.

The table 250 may comprise N rows and M columns to illustrate an example size of the feature map pyramid 150a-150n. The columns may represent decimation in the x direction (e.g., width). The rows may represent decimation in the y direction (e.g., height). However, the number of levels and/or the number of times the feature map pyramid 150a-150n may be decimated in each direction may be varied according to the design criteria of a particular implementation.

Levels LVL_00-LVL_MN are shown in the table 250. Each of the levels LVL_00_LVL_MN may represent a feature map level of the feature map pyramid 150a-150n. For example, each of the levels LVL_00-LVL_MN may correspond to one of the levels 150a-150n. In the example shown, the level LVL_MN may indicate that the height was downsampled M times and the width was downsampled N times.

A number of levels 252a-252m are shown in the first column (e.g., column 0) of each row in the table 250. The levels 252a-252m may represent 'stem' levels. The stem levels 252a-252m may be generated by decimating a previous stem level (e.g., from the row above) by height. In an example, when downsampling height, the resampler 110a may only need the upper neighbor pyramid level.

A number of levels 254a-254n are shown in each row of the table 250. The levels 254a-254n may represent 'leaf' levels. The leaf levels 254a-254n may be generated by decimating a width of a previous level (e.g., from the column to the left) from the same row. In an example, when downsampling width, the resampler 110a may only need the neighbor pyramid level shown to the left in the chart 250. The first leaf level 254a of each row may be generated in response to downsampling the corresponding stem levels 252a-252m. The following leaf levels 254b-254n may be generated by downsampling the previous leaf level (e.g., the leaf level 254c may be generated by downsampling the leaf level 254b in the x direction).

In an example, the stem level 252a (e.g., LVL_00) may be the full resolution feature map 150a. The full resolution feature map 150a may be received from the DRAM 86 and/or the shared memory 106 (e.g., not generated by the resampler 110a). The resampler 110a may be configured to downsample the full resolution feature map 150a in the x direction to generate the leaf level 254a (e.g., the dependent feature map LVL_01). The resampler 110a may be configured to downsample the leaf level 254a in the x direction to generate the leaf level 254b (e.g., to generate the dependent feature map LVL_02). The resampler 110a may continue to downsample the leaf levels 254c-254m until the last leaf level 254n for the first row (row 0) is generated (e.g., dependent level LVL_0N).

After all of the leaf levels 254a-254n have been generated for a particular row, the resampler 110a may generate the next of the stem levels 252a-252m from the previous stem level. In an example, after the leaf levels 254a-254n have been generated for row 0, the resampler 110a may generate the next stem level 252b by downsampling the previous stem level 254a in the y direction (e.g., by height). The stem level 252a may be a source (or parent) level for the dependent stem level 252b (e.g., LVL_10). Then the resampler 110a may generate the first leaf level 254a (e.g., the dependent level LVL_11) from the stem level 252b by downsampling in the x direction. The resampler 110a may continue to downsample the leaf levels 254b-254m until the last leaf level 254n for the row (e.g., row 1) is generated (e.g., the dependent level LVL_1N). Then the resampler 110a may generate the next row by downsampling the stem level 252b in the y direction to generate the next stem level 252c (e.g., LVL_20). The computer vision operator 104a may continue generating the stem levels 252a-252m and the corresponding leaf levels 254a-254n until the last level (e.g., LVL_MN in the example shown) is generated.

Based on the dependency relationship shown in the table 250, when processing one row of the feature map pyramid 150a-150n, at least two pyramid levels may be needed to ensure that further dependent pyramid levels may be generated. One of the stem levels 252a-252m (e.g., the stem level of the current row in the dependency relationship) may be stored while the leaf levels 254a-254n are generated for the current row. The stem level stored may be used to generate the next stem level. Each of the leaf levels 254a-254n may be stored until the next leaf level is generated. The leaf level stored may be used to generate the next leaf level and then may be discarded (or overwritten). Generally, the stem level for the current row, and the leaf level to the left of the level being generated may be stored. Storing the current stem level and the leaf level to the left of the level being generated may ensure that the two pyramid levels needed are stored and available to continue generating the rest of the pyramid levels 150a-150n.

In an example, the stem level 252a may be stored until the next stem level 252b is generated. After the stem level 252b (e.g., the stem level dependent from the stem level 252a) is generated, the processor 82 and/or the computer vision operator 104a may enable the stem level 252a to be discarded since the level may no longer be used. Similarly, the stem level 252b may be stored until the stem level 252c (e.g., the stem level dependent from the source stem level 252b) is generated.

In an example, the stem level 252b may be stored while the leaf levels 254a-254n (e.g., LVL_11-LVL_1N) are generated for the row 1. The stem level 252b may be used by the resampler 110a to generate the leaf level 254a. The stem level 252b may not be needed to generate the rest of the leaf levels 254b-254n, but may remain in storage because the stem level 252b may still be used to generate the next stem level 252c. The leaf level 254a may be stored while the next leaf level 254b is generated. After the leaf level 254b (e.g., the leaf level dependent from the leaf level 254a) is generated, the previous leaf level 254a (e.g., the parent leaf level) may not be used again. Since the leaf level 254a may not be used again, the processor 82 and/or the computer vision operator 104a may enable the leaf level 254a to be discarded (e.g., LVL_11 may be discarded). Similarly, the leaf level 254b may be stored until the leaf level 254c is generated (e.g., LVL_13, which is dependent from LVL_12), then the leaf level 254b may be discarded and the leaf level 254c may be stored until the next leaf level 254d is generated, etc.

The stem levels 252a-252m and/or the leaf levels 254a-254n that may be stored based on the dependency relationship 250 may be stored in the storage buffers 130a-130c. Since the computer processor 82 and/or the computer vision operator 104a may allocate the three storage buffers 130a-130c and two of the levels LVL_00-LVL_MN may be stored at a time, the storage buffers 130a-130c may provide sufficient storage capacity. The processor 82 and/or the computer vision operator 104a may store the levels in the storage buffers 130a-130c based on a pattern. The pattern may alternate the levels stored among the storage buffers 130a-130c to ensure that the stored levels do not over-write a level that is still needed to generate a dependent level. For example, the pattern may be configured to prevent the levels stored in the buffers 130a-130c from stepping on each other.

The pattern may comprise storing the stem levels 252a-252m as needed by alternating between the first storage buffer 130a (e.g., the buffer with the size FMAP or full_f-map) and the second storage buffer 130b (e.g., the buffer with the size ½FMAP or half_fmap). Generally, the pattern may comprise storing the stem levels 252a-252m that correspond to even rows (e.g., the stem level 252a for row 0, the stem level 252c for row 2, etc.) in the first storage buffer 130a and storing the stem levels that correspond to odd rows (e.g., the stem level 252b for row 1, the stem level 252d for row 3, etc.) in the second storage buffer 130b.

The pattern may comprise storing the leaf levels 254a-254n as needed by alternating between the first storage buffer 130a (e.g., the buffer with the size FMAP or full_f-map), the second storage buffer 130b (e.g., the buffer with the size ½FMAP or half_fmap) and the third storage buffer 130c (e.g., the buffer with the size ¼FMAP or quarter_f-map). The pattern implemented by the processor 82 and/or the computer vision operator 104a may only use the first storage buffer 130a when the first storage buffer 130a is not currently storing a needed one of the stem levels 252a-252m (e.g., a level that may be used again later). Similarly, the pattern implemented by the computer vision operator 104a may only use the second storage buffer 130b for the leaf levels 254a-254n when the second storage buffer 130b is not currently storing a needed one of the stem levels 252a-252m. The pattern may comprise storing the leaf levels 254a-254n that correspond to even rows (e.g., the leaf levels 254a-254n that were downsampled from the stem level 252a of row 0, the leaf levels 254a-254n that were downsampled from the stem level 252c of row 2, etc.) by alternating between the second storage buffer 130b and the third storage buffer 130c. The pattern may comprise storing the leaf levels 254a-254n that correspond to odd rows (e.g., the leaf levels 254a-254n that were downsampled from the stem level 252b of row 1, the leaf levels 254a-254n that were downsampled from the stem level 252d of row 3, etc.) by alternating between the first storage buffer 130a and the third storage buffer 130c.

The resampler 110a may be configured to generate the feature map levels (e.g., the stem levels 252a-252m and the leaf levels 254a-254n) that are used by at least one of the ROI proposals 152a-152n or have a dependent level. In an example, if one of the stem levels 252a-252m or one of the leaf levels 254a-254n do not have a dependent level and are not used by one of the ROI proposals 152a-152n (as determined by the processor 82), then the processor 82 may instruct the computer vision module 104a to skip (or omit) generating the particular level. The feature map levels 150a-150n that are generated and/or stored in the storage buffers 130a-130c may be stored in the pattern to ensure that each level is stored until no longer needed to create the dependent level(s) and may be discarded (e.g., overwritten) when no longer needed to create the dependent levels. The pattern of generating and/or storing the pyramid levels 150a-150n may enable the storage buffers 130a-130n to store a sufficient amount of information about the pyramid levels 150a-150n to generate dependent levels while keeping the amount of storage space needed for the pyramid levels 150a-150n within the storage constraints of the shared memory 106. The storage pattern may further enable the operations to be performed without accessing the DRAM bus 88 (e.g., avoid adding more transfers between the computer vision coprocessor 100 and the DRAM 86).

Figure 9:
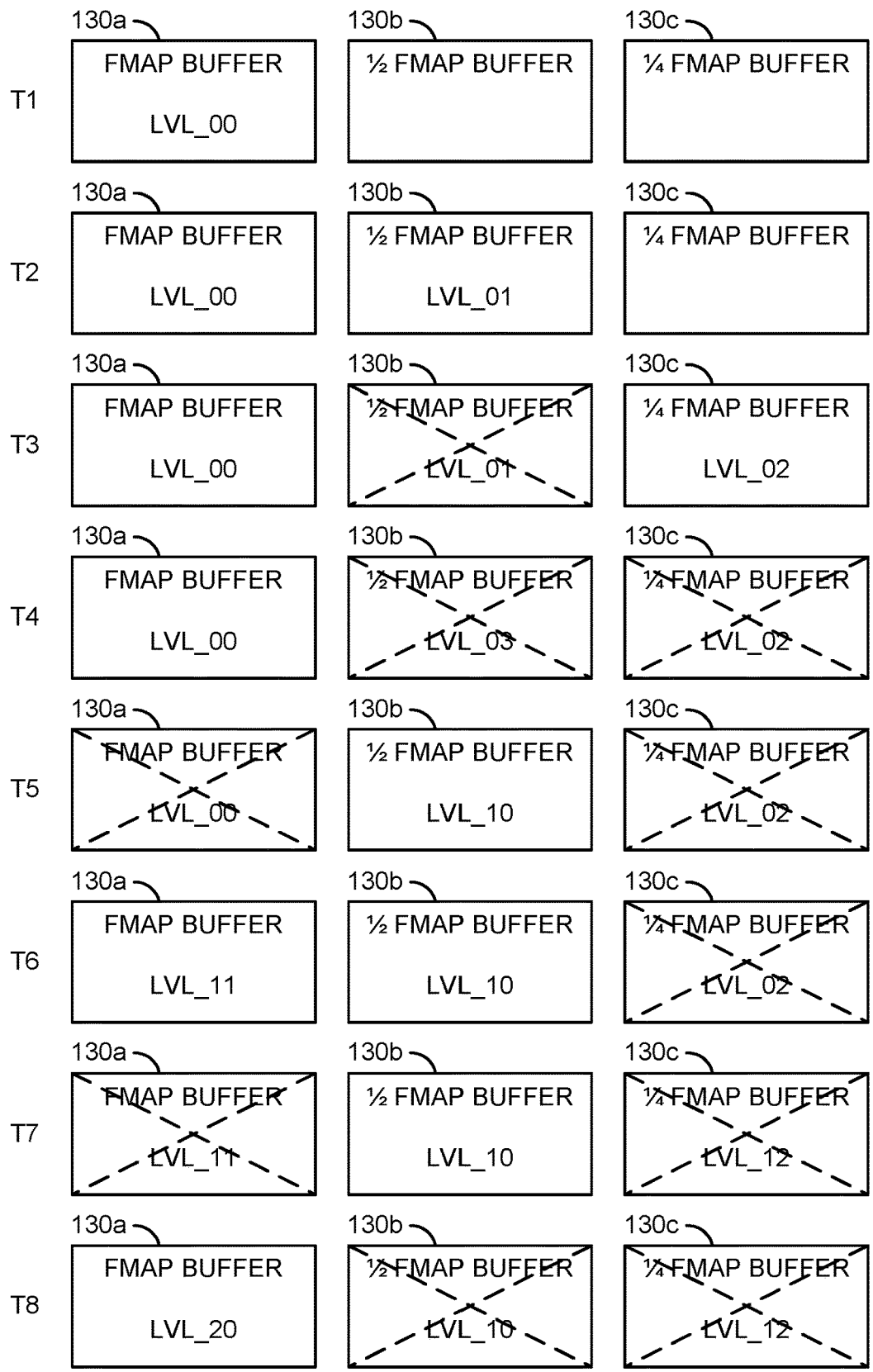
FIG. 9 is a diagram illustrating a pattern for storing pyramid levels in three storage buffers.

Referring to FIG. 9, a diagram illustrating a pattern for storing pyramid levels in three storage buffers is shown. An example scenario 300 is shown. The example scenario 300 may comprise an example feature map pyramid having a first row (row 0) having four levels (e.g., LVL_00-LVL_03), and a second row (row 1) having 3 levels (e.g., LVL_10-LVL_12).

In the example scenario, the full resolution feature map 150a may be the 5×5 feature map shown in association with FIG. 4. The computer vision operator 104a may allocate the storage buffers 130a-130c in the on-chip memory 106. Since the full resolution feature map 150a may be the largest feature map (e.g., 25 activation values) of the feature map pyramid 150a-150n, the processor 82 and/or the computer vision operator 104a may allocate the buffer 130a to be able to store at least the 25 values of the full resolution feature map 150a.

Since the full resolution feature map 150a has an odd number of rows and columns, the computer vision operator 104a may allocate the storage buffers 130b-130c based on the padded size of the full resolution feature map 150a. In the example shown in association with FIG. 5, for generating the dependent feature map 150b, the full resolution feature map 150a may be padded to a 5×6 feature map (e.g., 30 activation values). In the example shown in association with FIG. 6, for generating the dependent feature map 150c, the full resolution feature map 150a may be padded to a 6×5 feature map (e.g., 30 activation values). In an example, when the full resolution feature map 150a is downsampled by 2 in the x or y direction, the dependent feature map may be either a 5×3 feature map or a 3×5 feature map. The processor 82 and/or the computer vision operator 104a may allocate the storage buffer 130b to store at least 15 activation values.

Since the first dependent feature map (e.g., either the leaf level LVL_01 or the stem level LVL_10) may have an odd number of columns or an odd number of rows, respectively, the processor 82 and/or the computer vision operator 104a may allocate the storage buffer 130c based on the padded size of the dependent feature map. In an example, when the level LVL_01 is downsampled in the x direction by 2, the resulting dependent leaf level feature map LVL_02 may be a 5×2 feature map (e.g., 10 activation values). In another example, when the stem level LVL_10 is downsampled in the x direction by 2, the resulting dependent leaf level feature map LVL_11 may be a 3×3 feature map (e.g., 9 activation values). In yet another example, when the stem level LVL_10 is downsampled in the y direction by 2, the resulting dependent stem level feature map LVL_20 may be a 2×5 feature map (e.g., 10 activation values). The processor 82 and/or the computer vision operator 104a may allocate the largest possible value for the dependent level of at least 10 activation values for the size of the storage buffer 130c.

Additional downsampling may result in feature map levels that are smaller than 10 activation values. The allocated size of the storage buffers 130a-130c may be sufficient for the smaller feature maps. Generally, the processor 82 may instruct the computer vision operator 104a to allocate the size of the storage buffers 130a-130c to be approximately FMAP, ½FMAP and ¼FMAP based on the potential size of the feature maps generated. In the example 300, the feature map 130a may have a size allocated to accommodate at least 25 activation values, the feature map 130b may have a size allocated to accommodate at least 15 activation values and the feature map 130c may have a size allocated to accommodate at least 10 activation values.

In the example pattern 300, at a first time T1, the full resolution storage map (e.g., LVL_00) may be stored in the storage buffer 130a. The storage buffer 130a may have the size FMAP to accommodate the size of the full resolution storage buffer 150a. The storage buffers 130b-130c may be unused. At the time T1, the level LVL_00 may be available to be compared with the ranked ROI proposals 152a-152n. The resampler 110a may be configured to generate the first leaf level 254a (e.g., LVL_01) from the first stem level 252a.

At a time T2, the first leaf level LVL_01 may be stored in the second storage buffer 130b. The second storage buffer 130b may have the size ½FMAP to accommodate the size of the dependent feature map generated by decimating the full resolution feature map 150a in the x direction. At the time T2, the level LVL_01 may be available to be compared with the ranked ROI proposals 152a-152n. The storage buffer 130c may be unused. The storage buffer 130a may keep the stem level LVL_00 since the next stem level LVL_10 depends on the current stem level LVL_00. The resampler 110a may be configured to generate the second leaf level 254b (e.g., LVL_02) from the first leaf level 254a.

At a time T3, the second leaf level LVL_02 may be stored in the third storage buffer 130c. The third storage buffer 130c may have the size ¼FMAP to accommodate the size of the dependent feature map generated by decimating the feature map LVL_01 in the x direction. At the time T3, the level LVL_02 may be available to be compared with the ranked ROI proposals 152a-152n. The storage buffer 130b may be marked as dirty (e.g., the data stored may be overwritten) since no further feature map levels may be generated based on the level LVL_01. The storage buffer 130a may be unavailable since the stem level LVL_00 is still needed. The resampler 110a may be configured to generate the third leaf level 254c (e.g., LVL_03) from the second leaf level 254b.

At a time T4, the third leaf level LVL_03 may be stored in the second storage buffer 130b (e.g., the next available storage buffer). Since the level LVL_03 is smaller than the level LVL_01, the storage buffer 130b may have sufficient storage capacity for the next level LVL_03. At the time T4, the level LVL_03 may be available to be compared with the ranked ROI proposals 152a-152n. The storage buffers 130b-130c may both be marked as dirty since there are no further leaf levels for the current row. The storage buffer 130a may be unavailable since the stem level LVL_00 is still needed. In the example shown, the current row (row 0) is an even row and the stem level 252a used the full_fmap buffer 130a while the leaf levels alternated between the half_fmap buffer 130b and the quarter_fmap buffer 130c. The processor 82 may determine no more of the leaf levels 254a-254n are needed for the first row 0 (e.g., any additional levels LVL_04-LVL_0N may not be generated or stored). Next, the resampler 110a may be configured to generate the second stem level 252b (e.g., LVL_10) from the first stem level 252a.

At a time T5, the second stem level LVL_10 may be stored in the second storage buffer 130b (e.g., one of the available storage buffers). Since the level LVL_10 is half the size of the full resolution feature map 150a, the second stem level 252b may be stored in the second storage buffer 130b (e.g., the third storage buffer 130c may be available but, at a size of ¼FMAP, not large enough to store the dependent feature map). At the time T5, the level LVL_10 may be available to be compared with the ranked ROI proposals 152a-152n. The first storage buffer 130a may be marked as dirty since there are no further stem levels or leaf levels that directly depend on the level LVL_00. The third storage buffer 130c may remain marked as dirty. The resampler 110a may be configured to generate the first stem level 254a (e.g., LVL_11) for the current row from the stem level 252b (e.g., LVL_10).

At a time T6, the first leaf level LVL_11 may be stored in the first storage buffer 130a (e.g., one of the available storage buffers). Either the storage buffer 130a or the storage buffer 130c may be of sufficient size to accommodate the level LVL_11. At the time T6, the level LVL_11 may be available to be compared with the ranked ROI proposals 152a-152n. The storage buffer 130c may remain marked as dirty. The second storage buffer 130b may be unavailable, since the next stem level 252c may be dependent on the current stem level 252b. The resampler 110a may be configured to generate the second stem level 254b (e.g., LVL_12) for the current row from the first stem level 254a (e.g., LVL_11).

At a time T7, the second leaf level LVL_12 may be stored in the third storage buffer 130c (e.g., the one available storage buffer). The first storage buffer 130a may be marked as dirty since no further leaf levels may be dependent on the level LVL_11 (e.g., only the level LVL_12 was dependent on LVL_11). The third storage buffer 130c may be marked as dirty since the leaf level LVL_12 may be the last level of the current row. At the time T7, the level LVL_12 may be available to be compared with the ranked ROI proposals 152a-152n. The storage buffer 130b may be unavailable since the stem level LVL_10 is still needed. In the example shown, the current row (row 1) is an odd row and the stem level 252b used the half_fmap buffer 130b while the leaf levels alternated between the full_fmap buffer 130a and the quarter_fmap buffer 130c. The processor 82 may determine no more of the leaf levels 254a-254n are needed for the second row 1 (e.g., any additional levels LVL_13-LVL_1N may not be generated or stored). Next, the resampler 110a may be configured to generate the third stem level 252c (e.g., LVL_20) from the second stem level 252b (e.g., LVL_10).

At a time T8, the third stem level LVL_20 may be stored in the first storage buffer 130a (e.g., one of the available storage buffers). Even though the third storage buffer 130c may have sufficient capacity for the third stem level, since the current row (e.g., row 2) is an even row, the first storage buffer 130a may be used. At the time T7, the level LVL_20 may be available to be compared with the ranked ROI proposals 152a-152n. The second storage buffer may be marked as dirty since the second stem level LVL_10 may no longer be used to generate dependent levels. The third storage buffer may remain marked as dirty. The resampler 110a may generate a next dependent level and the processor 82 and/or the computer vision operator 104a may continue following the pattern 300 to store the generated feature maps in the storage buffers 130a-130c as needed.

The pattern 300 may enable the feature map levels to be generated on the fly, while only using the on-chip memory 106. Levels that are no longer used to generate dependent levels may be discarded. In the example shown, the levels may be discarded by enabling the buffers 130a-130c to be available to be overwritten. The ROI proposals may only use some of the pyramid levels 150a-150n. The processor 82 may re-rank the ROI proposals 152a-152n corresponding to an order of the levels 150a-150n. Ranking the ROI proposals 152a-152n may enable the processor 82 to determine whether a particular level is actually needed for the available ROI proposals 152a-152n. If a level is not needed for a particular ROI proposal, the processor 82 may cause the computer vision operator 104a to omit generating the level. For example, levels that do not have any corresponding ROI proposals 152a-152n and do not have other dependent levels may be skipped. In an example, if an example row (e.g., row 5) has levels LVL_50-LVL_56 but levels LVL_53-LVL_56 do not have any of the region of interest proposals 152a-152n, the processor 82 may instruct the computer vision operator 104a to only generate the level LVL_50, the level LVL_51 and the level LVL_52 and omit generating the levels LVL_53-LVL_56. Once all the ROI proposals 152a-152n are processed, the computer vision operator 104a may stop generating additional levels of the feature map pyramid 150a-150n.

In some scenarios, the input feature map (e.g., the full resolution feature map 150a) may be too large for the on-chip memory 106. In an example, the total size of the storage buffers 130a-130c to implement the pattern 300 (e.g., FMAP+½FMAP+¼FMAP) may be larger than the on-chip memory 106. Embodiments, of the apparatus 100 may be configured to divide the full resolution feature map 150a into batches. In an example, a minimum number of batches may be generated along the channel dimension, so that each batch may fit in the on-chip memory 106. The apparatus 100 may be configured to run the RoI Align process on each batch independently. Each batch may be treated as the full resolution feature map 150a for generating the feature map pyramid 150a-150n, allocating the size of the storage buffers 130a-130c and/or implementing the pattern 300. Each batch may be processed individually. Each of the ROI proposals 152a-152n may be assigned to an appropriate one of the batches.

Figure 10:
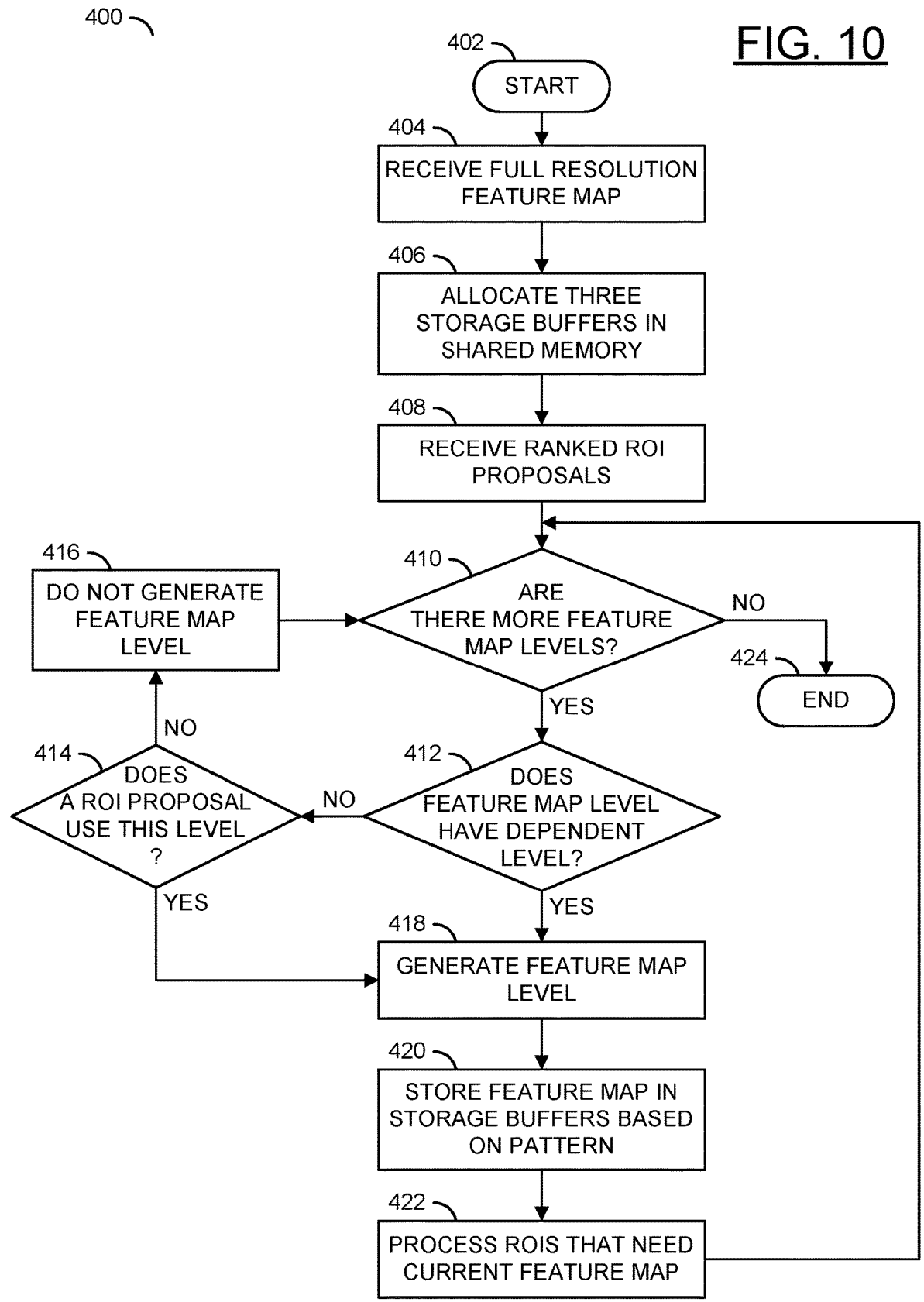
FIG. 10 is a flow diagram illustrating a method for implementing a hardware efficient RoI Align.

Referring to FIG. 10, a method (or process) 400 is shown. The method 400 may implement a hardware efficient RoI Align. The method 400 generally comprises a step (or state) 402, a step (or state) 404, a step (or state) 406, a step (or state) 408, a decision step (or state) 410, a decision step (or state) 412, a decision step (or state) 414, a step (or state) 416, a step (or state) 418, a step (or state) 420, a step (or state) 422, and a step (or state) 424.

The step 402 may start the method 400. In the step 404, the shared memory 106 may receive the full resolution feature map 150a from the DRAM 86. Next, in the step 406, the computer vision operator 104a and/or the processor 82 may allocate the three storage buffers 130a-130c in the shared memory 106. In an example, the processor 82 may determine a size of the full resolution feature map 150a and allocate the storage buffers 130a-130c having sizes FMAP, ½FMAP and ¼FMAP. In the step 408, the computer vision coprocessor 100 may receive one or more of the ranked ROI proposals 152a-152n from the stack memory of the processor 82. For example, the processor 82 may rank previously generated region of interest proposals and store the ranked proposals in a stack memory (e.g., the DRAM 86 in some embodiments). Next, the method 400 may move to the decision step 410.

In the decision step 410, the processor 82 may determine whether there are more of the feature map levels 150a-150n. For example, the feature map levels 150a-150n may be generated to ensure that the last interpolation operation decimates to less than a factor of 2. If there are more of the feature map levels 150a-150n, then the method 400 may move to the decision step 412. In the decision step 412, the processor 82 may determine whether a current one of the feature map levels 150a-150n has a dependent level (e.g., is used to generate one of the leaf levels 254a-254n for the current row or is used to generate a next one of the stem levels 252b-252m). If the current one of the feature map levels 150a-150n has a dependent level, then the method 400 may move to the step 418. If the current one of the feature map levels 150a-150n does not have a dependent level, then the method 400 may move to the decision step 414.

In the decision step 414, the processor 82 may determine whether one of the ranked ROI proposals 152a-152n uses the current one of the feature map levels 152a-152n. If one of the ROI proposals 152a-152n uses the current one of the feature map levels 150a-150n, then the method 400 may move to the decision step 418. If the current one of the feature map levels 152a-152n is not used, then the method 400 may move to the step 416. In the step 416, the processor 82 may not instruct the computer vision operator 104a to generate the current one of the feature map levels 150a-150n. Next, the method 400 may return to the decision step 410.

In the step 418, the resampler 110a may generate the feature map level. Next, in the step 420, the computer vision operator 104a may store the generated feature map level in one of the storage buffers 130a-130c based on the pattern described in association with FIG. 7 and FIG. 8. In the step 422, the processor 82 may determine which of the ranked ROI proposals 152a-152n need the current one of the feature map levels 150a-150n and the computer vision operator 104a may process the ranked ROI proposals 152a-152n that need the current feature map. Next, the method 400 may return to the decision step 410.

In the decision step 410, if there are no more of the feature map levels 150a-150n, then the method 400 may move to the step 424. The step 424 may end the method 400.

Figure 11:
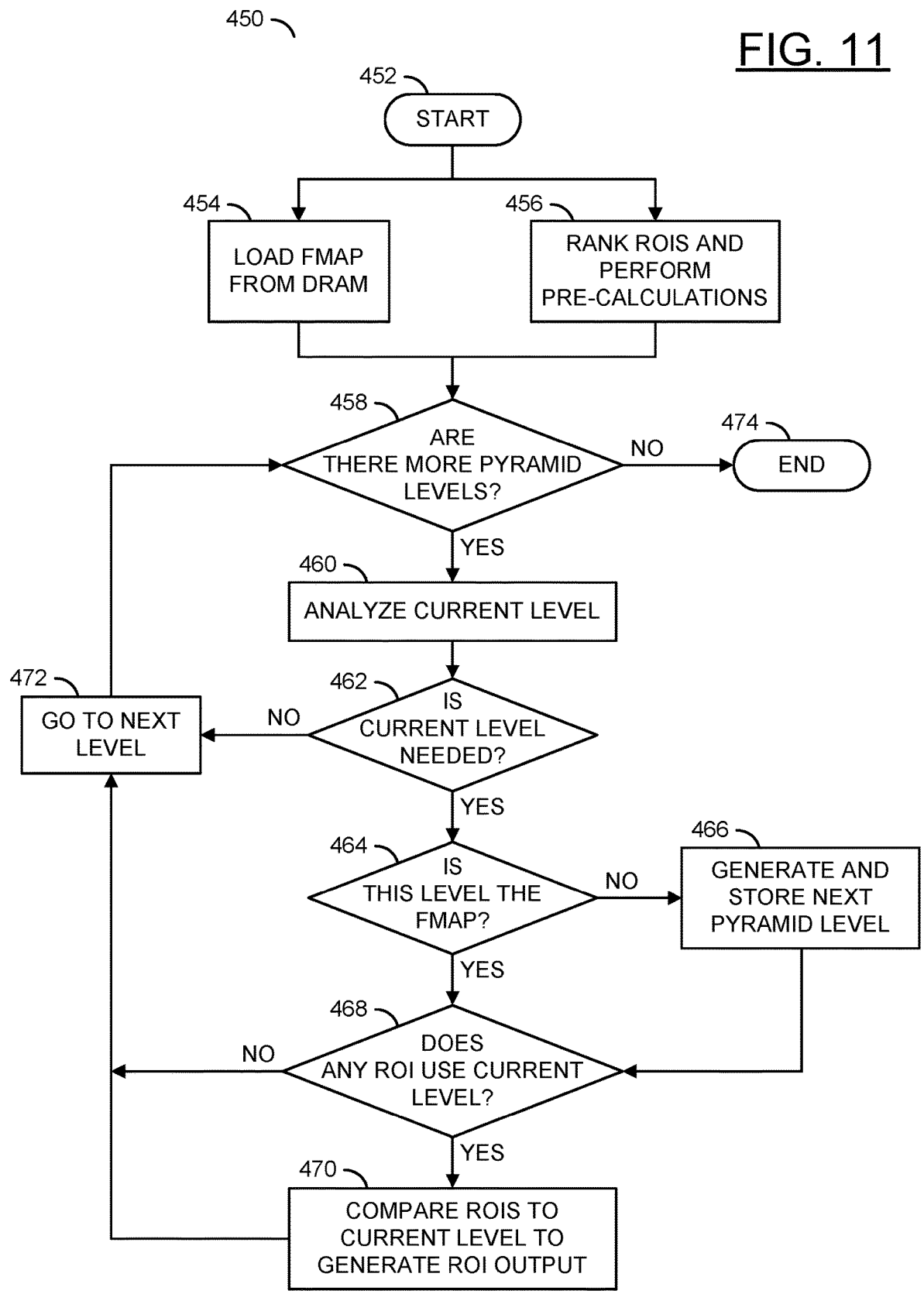
FIG. 11 is a flow diagram illustrating a method for determining whether to generate a next level of a feature map pyramid.

Referring to FIG. 11, a method (or process) 450 is shown. The method 450 may determine whether to generate a next level of a feature map pyramid. The method 450 generally comprises a step (or state) 452, a step (or state) 454, a step (or state) 456, a decision step (or state) 458, a step (or state) 460, a decision step (or state) 462, a decision step (or state) 464, a step (or state) 466, a decision step (or state) 468, a step (or state) 470, and a step (or state) 472.

The step 452 may start the method 400. In the step 454, the computer vision coprocessor 100 may load the full resolution feature map 150a to the shared memory 106 from the DRAM 86. In the step 456, the processor 82 may rank the regions of interest and/or perform various pre-calculations. In an example, the step 454 and the step 456 may be performed generally in parallel. Next, the method 450 may move to the decision step 458.

In the decision step 458, the processor 82 may determine whether there are more of the feature map levels 150a-150n. If there are more of the feature map levels 150a-150n, then the method 450 may move to the step 460. In the step 460, the processor 82 may analyze the current one of the feature map levels 150a-150n. Next, the method 450 may move to the decision step 462.

In the decision step 462, the processor 82 may determine whether the current one of the feature map levels 150a-150n is needed. In one example, the current one of the feature map levels 150a-150n may be needed if the current one of the feature map levels 150a-150n is used by at least one of the ranked ROI proposals 152a-152n. In another example, the current one of the feature map levels 150a-150n may be needed if one of the dependent levels is generated from the current one of the feature map levels 150a-150n. If the current one of the feature map levels 150a-150n is not needed, then the method 450 may move to the step 472. If the current one of the feature map levels 150a-150n is needed, then the method 450 may move to the decision step 464.

In the decision step 464, the processor 82 may determine whether the current one of the feature map levels 150a-150n is the full resolution feature map 150a. If the current one of the feature map levels 150a-150n is the full resolution feature map 150a, then the method 450 may move to the decision step 468. If the current one of the feature map levels 150a-150n is not the full resolution feature map 150a, then the method 450 may move to the step 466. In the step 466, the computer vision operator 104a may generate and store the next one of the feature map levels 150a-150n in one of the storage buffers 130a-130c (to be described in association with FIG. 13). Next, the method 450 may move to the decision step 468.

In the decision step 468, the processor 82 may determine whether any of the ranked ROI proposals 152a-152n use the current one of the feature map levels 150a-150n. If none of the ROI proposals 152a-152n use the current one of the feature map levels 150a-150n, then the method 450 may move to the step 472. If at least one of the ROI proposals 152a-152n use the current one of the feature map levels 150a-150n, then the method 450 may move to the step 470. In the step 470, the processor 82 may compare the ranked ROI proposals 152a-152n to the current one of the feature map levels 150a-150n in order to enable the computer vision operator 104a to generate one of the ROI outputs 170a-170n (to be described in association with FIG. 12). Next, the method 450 may move to the step 472.

In the step 472, the processor 82 may go to a next one of the feature map levels 150a-150n. Next, the method 450 may return to the decision step 458. In the decision step 458, if there are no more of the feature map pyramid levels 150a-150n, then the method 450 may move to the step 474. The step 474 may end the method 450.

Figure 12:
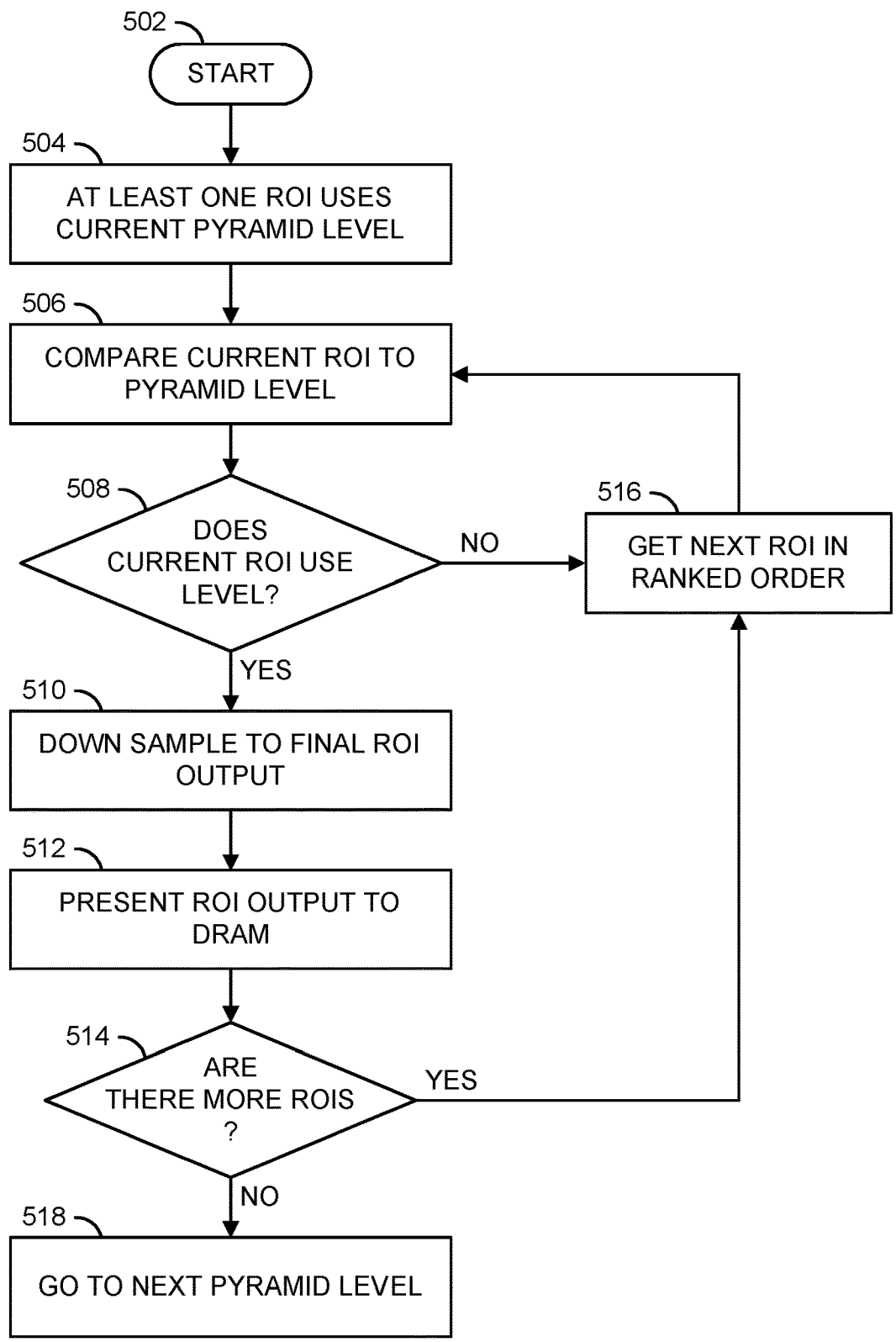
FIG. 12 is a flow diagram illustrating a method for generating a region of interest output in response to a pyramid level and a region of interest proposal.

Referring to FIG. 12, a method (or process) 500 is shown. The method 500 may generate a region of interest output in response to a pyramid level and a region of interest proposal. The method 500 generally comprises a step (or state) 502, a step (or state) 504, a step (or state) 506, a decision step (or state) 508, a step (or state) 510, a step (or state) 512, a decision step (or state) 514, a step (or state) 516, and a step (or state) 518.

The step 502 may start the method 500. In the step 504, the processor 82 may determine that at least one of the ranked ROI proposals 152a-152n uses the current one of the pyramid levels 150a-150n. Next, in the step 506, the processor 82 may compare a current one of the ranked ROI proposals 152a-152n to the current one of the pyramid levels 150a-150n. In an example, the processor 82 may retrieve the information about the current one of the feature maps 150a-150n from the computer vision coprocessor 100 and compare the information to the ranked ROI proposals 152a-152n in the stack memory. Next, the method 500 may move to the decision step 508.

In the decision step 508, the processor 82 may determine whether the current one of the ranked ROI proposals 152a-152n uses the current one of the feature map levels 150a-150n. In an example, whether the ranked ROI proposals 152a-152n uses one of the feature map levels 150a-150n may be determined based on the size of the ranked ROI proposals 152a-152n and the size of the feature map levels 150a-150n. The processor 82 may select the ROI proposals 152a-152n for the feature map levels 150a-150n to ensure that the last interpolation operation (e.g., ROI size on the current pyramid level to pooled size) decimates to less than a factor of two. The processor 82 may determine which of the feature map levels 150a-150n is suitable for a cluster of the ranked ROIs 152a-152n. If the current one of the ranked ROI proposals 152a-152n does not use the current one of the feature map levels 150a-150n, then the method 500 may move to the step 516. If the current one of the ranked ROI proposals 152a-152n does use the current one of the feature map levels 150a-150n, then the method 500 may move to the step 510.

In the step 510, the computer vision operator 104a may downsample to the final ROI output. For example, the processor 82 may send the matching one of the ROI proposals 152a-152n to the shared memory 106 (e.g., the stored ROI proposal 154). The ROI proposal 154 may be communicated to the computer vision operator 104*a* to generate the final ROI output. The resampler 110*a* may be configured to project the cluster of the regions of interest onto the current one of the feature map levels 150*a*-150*n*. The resampler 110*a* may be configured to downsample the region of interest proposal 154 projected to an output region of interest. Next, in the step 512, the computer vision operator 104*a* may present the final output ROI to the output buffer 160 of the shared memory 106. The final output ROI may be presented as one of the output ROIs 170*a*-170*n* to the DRAM 86. Next, the method 500 may move to the decision step 514.

In the decision step 514, the processor 82 may determine whether there are more of the ranked ROI proposals 152*a*-152*n*. If there are more of the ranked ROI proposals 152*a*-152*n*, then the method 500 may move to the step 516. In the step 516, the processor 82 may analyze the next one of the ranked ROI proposals 152*a*-152*n* in the ranked order. Next, the method 500 may return to the step 506. In the decision step 514, if there are no more of the ranked ROI proposals 152*a*-152*n*, then the method 500 may move to the step 518. In the step 518, the method 500 may end by going to a next one of the pyramid levels 150*a*-150*n* (as described in association with FIG. 11).

Figure 13:
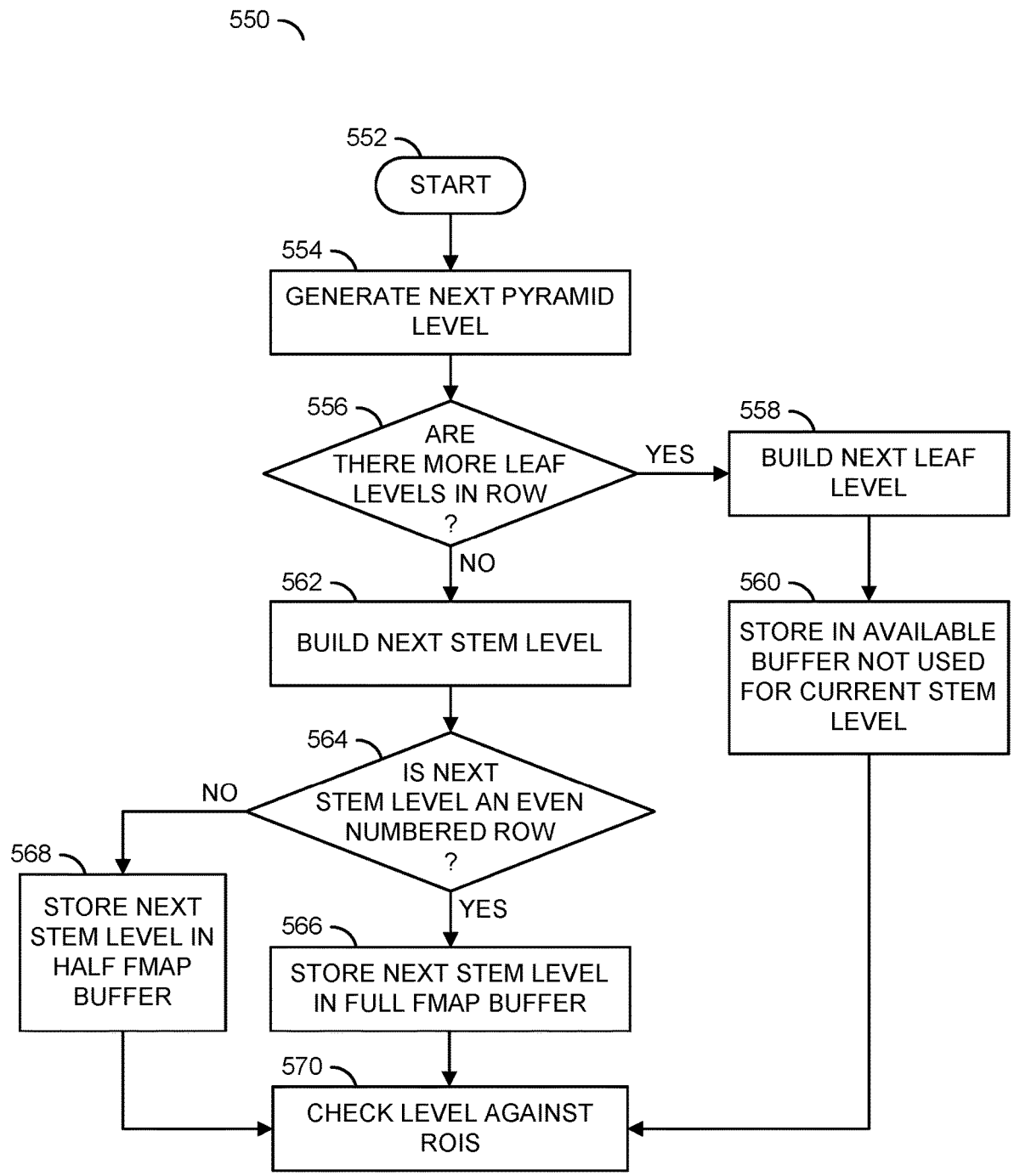
FIG. 13 is a flow diagram illustrating a method for storing feature map levels in storage buffers in a pattern.

Referring to FIG. 13, a method (or process) 550 is shown. The method 550 may store feature map levels in storage buffers in a pattern. The method 550 generally comprises a step (or state) 552, a step (or state) 554, a decision step (or state) 556, a step (or state) 558, a step (or state) 560, a step (or state) 562, a decision step (or state) 564, a step (or state) 566, a step (or state) 568, and a step (or state) 570.

The step 552 may start the method 550. In the step 554, the processor 82 may determine that a next one of the pyramid levels 150*a*-150*n* should be generated. Next, the method 550 may move to the decision step 556.

In the decision step 556, the processor 82 may determine whether there are more of the leaf levels 254*a*-254*n* in the current row. If there are more leaf levels 254*a*-254*n* in the current row, then the method 550 may move to the step 558. In the step 558, the resampler 110*a* may build the next one of the leaf levels 254*a*-254*n*. Next, in the step 560, the leaf level generated may be stored in an available one of the storage buffers 130*a*-130*c* not being used for the current one of the stem levels 252*a*-252*m*. In one example, for an even row, the leaf level generated may be stored in either the half_fmap buffer 130*b* or the quarter_fmap buffer 130*c* on an alternating basis. In another example, for an odd row, the leaf level generated may be stored in either the full_fmap buffer 130*a* or the quarter_fmap buffer 130*c* on an alternating basis. Next, the method 550 may move to the step 570.

In the decision step 556, if there are no more of the leaf levels 254*a*-254*n* in the current row, then the method 550 may move to the step 562. In the step 562, the resampler 110*a* may build the next one of the stem levels 252*a*-252*m*. Next, the method 550 may move to the decision step 564.

In the decision step 564, the processor 82 and/or the computer vision coprocessor 100 may determine whether the next one of the stem levels 252*a*-252*m* is an even numbered row. If the generated stem level is an even numbered row, then the method 550 may move to the step 566. In the step 566, the stem level generated by the resampler 110*a* may be stored in the full_fmap buffer 130*a*. Next, the method 550 may move to the step 570. In the decision step 564, if the generated stem level is an odd numbered row, then the method 550 may move to the step 568. In the step 568, the stem level generated by the resampler 110*a* may be stored in the half_fmap buffer 130*b*. Next, the method 550 may move to the step 570. In the step 570, the method 550 may end by checking the generated level against the ranked ROIs 152*a*-152*n* (e.g., as described in association with FIG. 12).

Figure 14:
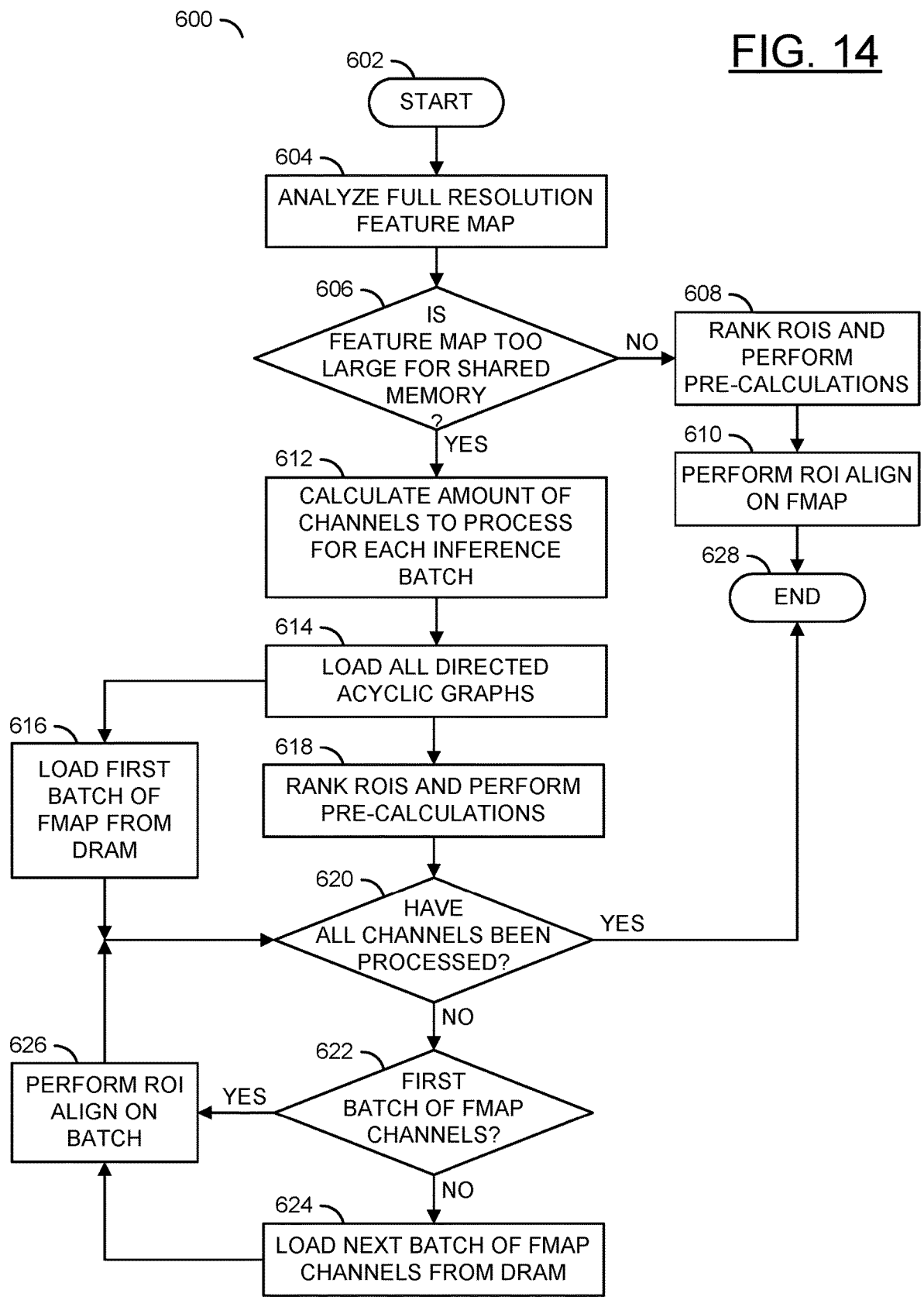
FIG. 14 is a flow diagram illustrating a method for dividing a feature map into batches and performing RoI Align on batches independently.

Referring to FIG. 14, a method (or process) 600 is shown. The method 600 may divide a feature map into batches and perform RoI Align on batches independently. The method 600 generally comprises a step (or state) 602, a step (or state) 604, a decision step (or state) 606, a step (or state) 608, a step (or state) 610, a step (or state) 612, a step (or state) 614, a step (or state) 616, a step (or state) 618, a decision step (or state) 620, a decision step (or state) 622, a step (or state) 624, a step (or state) 626, and a step (or state) 628.

The step 602 may start the method 600. In the step 604, the processor 82 may analyze the full resolution feature map 150*a*. In an example, the processor 82 may compare the size of the full resolution feature map 150*a* to the capacity and/or availability of the shared memory 106. Next, the method 600 may move to the decision step 606.

In the decision step 606, the processor 82 may determine whether the full resolution feature map 150*a* is too large for the shared memory 106. For example, the processor 82 may determine whether the full resolution feature map 150*a* is too large for the FMAP+½FMAP+¼FMAP size to be allocated in the shared memory 106. If the full resolution feature map 150*a* is not too large for the shared memory 106, then the method 600 may move to the step 608. In the step 608, the processor 82 may rank the ROIs and perform any pre-calculations. Next, the method 600 may move to the step 610. In the step 610, the processor 82 and the computer vision coprocessor 100 may perform the RoI Align on the full resolution feature map 150*a* (e.g., as described in association with FIGS. 10-13). Next, the method 600 may move to the step 628.

In the decision step 606, if the full resolution feature map 150*a* is too large for the shared memory 106, then the method 600 may move to the step 612. In the step 612, the processor 82 may calculate the amount of channels to process for each inference batch. For example, the processor 82 may divide the full resolution feature map 150*a* into batches each having a size that may fit the FMAP+½FMAP+¼FMAP size to be allocated in the shared memory 106 and perform the RoI Align on each batch independently. Next, in the step 614, the processor 82 may load all directed acyclic graphs to the scheduler 102. In the step 616, the computer vision coprocessor 100 may load the first batch of the full resolution feature map 150*a* to the shared memory 106 from the DRAM 86. In the step 618, the processor 82 may rank the region of interest proposals and/or perform any pre-calculations. In an example, the step 616 and the step 618 may be performed generally in parallel. Next, the method 600 may move to the decision step 620.

In the decision step 620, the processor 82 may determine whether all of the channels have been processed. If all of the channels have not been processed, then the method 600 may move to the decision step 622. In the decision step 622, the processor 82 may determine whether the current batch is the first batch of channels of the full resolution feature map 150*a*. If the current batch is not the first batch of channels of the full resolution feature map 150*a*, then the method 600 may move to the step 624. In the step 624, computer vision coprocessor 100 may load the next batch of the full resolution feature map 150*a* to the shared memory 106 from the DRAM 86. Next, the method 600 may move to the step 626. In the decision step 622, if the current batch of the full resolution feature map 150a is the first batch of channels, then the method 600 may move to the step 626.

In the step 626, the processor 82 and/or the computer vision coprocessor 100 may perform the RoI Align on the current batch (e.g., as described in association with FIGS. 10-13 by treating the current batch as the full resolution feature map 150a). Next, the method 600 may return to the decision step 620. In the decision step 620 if all of the channels have been processed, then the method 600 may move to the step 628. The step 628 may end the method 600.

Figure 15:
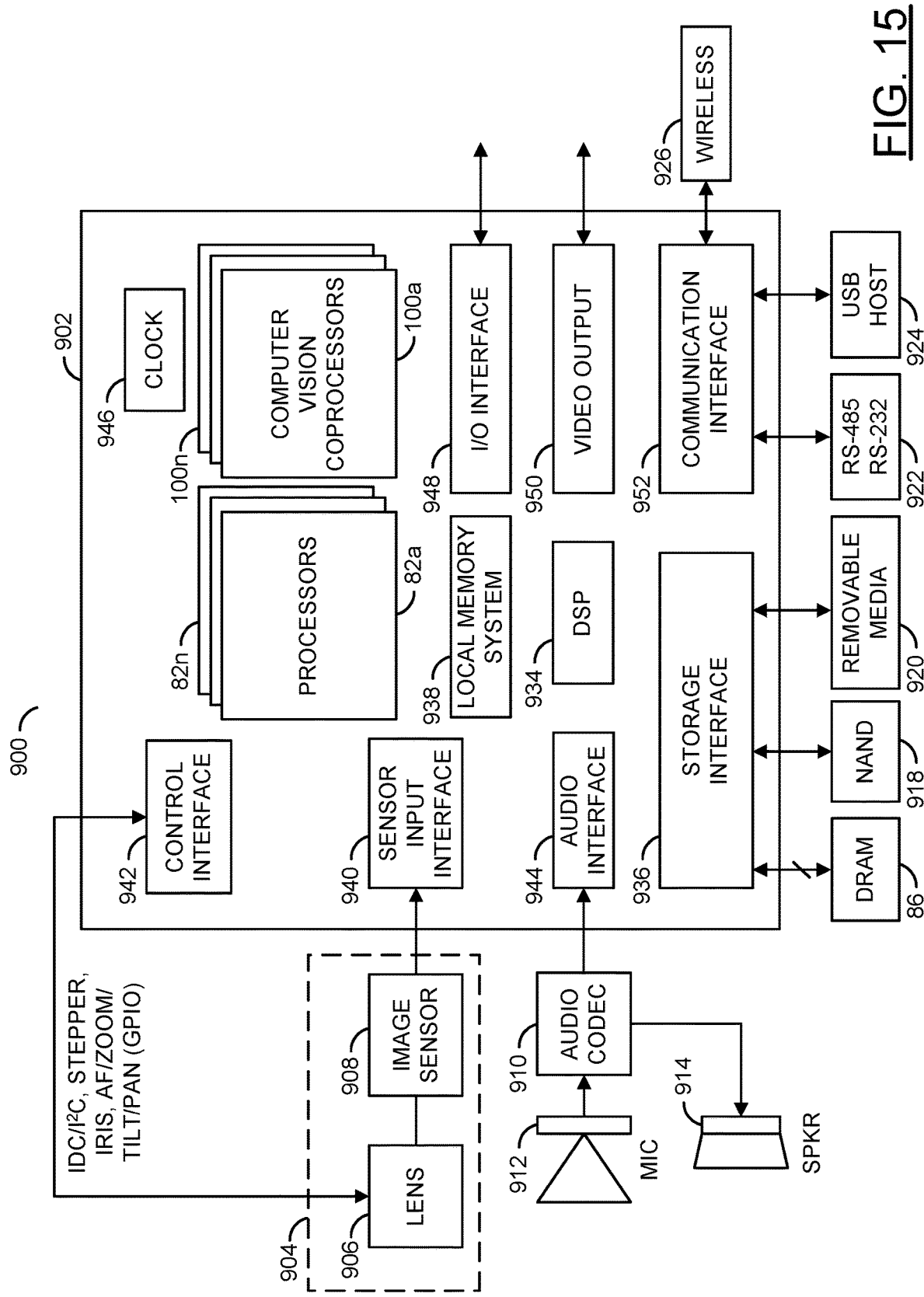
FIG. 15 is a diagram illustrating a camera system in accordance with an embodiment of the invention.

Referring to FIG. 15, a diagram illustrating a camera system in accordance with an embodiment of the invention is shown. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 14.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near a camera. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) the external memory 86, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of instances of the processor 82 (e.g., the processors 82a-82n), a number of instances of the computer vision coprocessor 100 (e.g., the coprocessors 100a-100n), a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. In various embodiments, the circuits 82a-82n may include one or more embedded processors (e.g., ARM, etc.). In an example, one or more of the circuits 100a-100n may implement a two-stage object detection engine in accordance with an example embodiment of the invention. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 86, the non-volatile memory 918, and the removable media 920. One or more of the DRAM 86, the non-volatile memory 918 and/or the removable media 920 may store computer readable instructions. The computer readable instructions may be read and executed by the processors 82a-82n. In response to the computer readable instructions, the processors 82a-82n may be operational to operate as controllers for the computer vision coprocessors 100a-100n. For example, the resources 104a-104n may be configured to efficiently perform various specific operations in hardware and the processors 82a-82n may be configured to make decisions about how to handle input/output to/from the various resources 104a-104n.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 82a-82n, 100a-100n and 934 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 86, the NAND 918, etc.). When executed by one or more of the processors 82*a*-82*n*, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 86, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 82*a*-82*n* and/or one or more of the coprocessors 100*a*-100*n*. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound ($I^2S$) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee, USB, Wi-Fi, UART, etc.). In one example, the communication module 952 may implement a secure digital input output (SDIO) interface. The communication module 952 may include support for wireless communication by one or more wireless and/or cellular protocols such as Bluetooth®, ZigBee, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The communication devices 110 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a memory comprising three storage buffers; and
   a circuit configured to (i) receive a full resolution feature map, (ii) allocate said three storage buffers in said memory based on a size of said full resolution feature map, (iii) receive a plurality of regions of interest that have been ranked based on a feature map pyramid, (iv) generate a plurality of levels of said feature map pyramid starting from said full resolution feature map and (v) store said levels in said storage buffers, wherein
   (a) said circuit generates said levels that (i) are used by at least one of said plurality of regions of interest or (ii) have one or more dependent levels, and
   (b) said levels that are generated are stored in said storage buffers in a pattern that (i) ensures said levels are stored until each of said dependent levels have been created from said levels and (ii) enables said levels to be discarded after being used to create each of said dependent levels.

2. The apparatus according to claim 1, wherein (i) a first of said storage buffers has a largest size, (ii) a second of said storage buffers has an intermediate size and (iii) a third of said storage buffers has a smallest size.

3. The apparatus according to claim 1, wherein discarding said levels after being used to create each of said dependent levels enables said three storage buffers to be repeatedly re-used to store said levels as said levels are generated.

4. The apparatus according to claim 1, wherein said pattern enables said levels of said feature map pyramid to be stored in said memory (a) within capacity constraints of said memory and (b) without adding to data transfers with a dynamic random-access memory.

5. The apparatus according to claim 1, wherein said plurality of regions of interest are ranked by a processor configured to (i) calculate a size of each of said regions of interest and (ii) cluster said regions of interest in response to (a) said size of said regions of interest and (b) a size of said levels of said feature map pyramid.

6. The apparatus according to claim 1, wherein (i) said apparatus is configured to implement a Region of Interest Align operation for a two-stage object detection and (ii) said plurality of regions of interest are pre-generated by a region-proposal network prior to said Region of Interest Align operation.

7. The apparatus according to claim 1, further comprising a processor configured to determine which one of said levels of said feature map pyramid is a suitable feature map for a cluster of said plurality of said regions of interest, wherein said circuit is further configured to (i) project said cluster of said regions of interest onto said suitable feature map to create a projected region, (ii) downsample said projected region to an output region of interest and (iii) present said output region of interest to a dynamic random-access memory.

8. The apparatus according to claim 1, further comprising a processor configured to (i) divide said full resolution feature map into a plurality of batches and (ii) enable said circuit to operate on said plurality of batches as if each of said plurality of batches is said full resolution feature map, wherein a size of each of said plurality of batches fits in said memory.

9. The apparatus according to claim 8, wherein a Region of Interest Align operation is performed on each of said batches independently when said full resolution feature map is too large for said memory.

10. The apparatus according to claim 1, further comprising a processor configured to execute computer readable instructions, wherein (a) said computer readable instructions enable said processor to determine (i) whether said levels are used by at least one of said plurality of regions of interest and (ii) whether said levels have one or more of said dependent levels and (b) ranking said plurality of regions of interest enables said processor to determine which of said levels are used by at least one of said plurality of regions of interest.

11. A method for storing a feature map in a memory, comprising the steps of:
receiving a full resolution feature map;
allocating three storage buffers in a memory based on a size of said full resolution feature map;
receiving a plurality of regions of interest that have been ranked based on a feature map pyramid;
generating a plurality of levels of said feature map pyramid starting from said full resolution feature map; and
storing said levels in said storage buffers, wherein
(a) said levels (i) are used by at least one of said plurality of regions of interest or (ii) have one or more dependent levels, and
(b) said levels that are generated are stored in said storage buffers in a pattern that (i) ensures said levels are stored until no longer needed to create one of said dependent levels and (ii) enables said levels to be discarded when no longer needed to create one of said dependent levels.

12. The method according to claim 11, wherein (a) said memory (i) is configured to store/present data in response to input/output requests and (ii) comprises said three storage buffers and (b) a circuit generates said levels.

13. The method according to claim 11, wherein (i) said plurality of levels comprise stem levels and leaf levels, (ii) said leaf levels are one of said dependent levels generated by downsampling (a) a width of one of said stem levels or (b) a width of one of said leaf levels and (iii) said stem levels that are one of said dependent levels are generated by downsampling a height of one of said stem levels.

14. The method according to claim 13, wherein said full resolution feature map is (i) a first of said stem levels and (ii) stored in a first of said storage buffers.

15. The method according to claim 13, wherein said pattern comprises the steps of:
storing a current one of said stem levels in said a first of said storage buffers;
storing one of said leaf levels generated from said current one of said stem levels in a second of said storage buffers;
alternatively storing said leaf levels generated from a previous of said leaf levels in a third of said storage buffers and said second of said storage buffers; and
storing a next of said stem levels generated from said current one of said stem levels in said second of said storage buffers.

16. The method according to claim 13, wherein said pattern comprises the steps of:
storing a current of said stem levels in a second of said storage buffers,
storing one of said leaf levels generated from said current one of said stem levels in a first of said storage buffers,
alternately storing said leaf levels generated from a previous of said leaf levels in a third of said storage buffers and said second of said storage buffers; and
storing a next of said stem levels generated from said current one of said stem levels in said first of said storage buffers.

17. The method according to claim 11, wherein (i) a first of said storage buffers has a size of said full resolution feature map, (ii) a second of said storage buffers has a size of half of said full resolution feature map and (iii) a third of said storage buffers has a size of one quarter of said full resolution feature map.

18. The method according to claim 11, wherein (i) a next level of said plurality of levels of said feature map pyramid is generated by performing an interpolation operation on a previous level of said feature map pyramid and (ii) said next level is one of said dependent levels.

19. The method according to claim 18, wherein (i) said interpolation operation decimates one of (a) a height and (b) a width of said previous level by a factor of two and (ii) a last of said interpolation operations decimates less than a factor of two.

20. The method according to claim 11, wherein said pattern enables said levels of said feature map pyramid to be generated on an as-needed basis.

* * * * *